US00RE50190E

(19) United States
(12) Reissued Patent
Kinoshita et al.

(10) Patent Number: US RE50,190 E
(45) Date of Reissued Patent: Oct. 29, 2024

(54) CONTROL APPARATUS AND ROBOT SYSTEM

(71) Applicant: SEIKO EPSON CORPORATION, Tokyo (JP)

(72) Inventors: Toyotaro Kinoshita, Azumino (JP); Toshiyuki Ishigaki, Sakata (JP)

(73) Assignee: SEIKO EPSON CORPORATION (JP)

(21) Appl. No.: 18/090,599

(22) Filed: Dec. 29, 2022

Related U.S. Patent Documents

Reissue of:
(64) Patent No.: 10,894,316
Issued: Jan. 19, 2021
Appl. No.: 16/000,084
Filed: Jun. 5, 2018

(30) Foreign Application Priority Data

Jun. 6, 2017 (JP) ..... 2017-111275
Nov. 7, 2017 (JP) ..... 2017-214446

(51) Int. Cl.
*B25J 9/00* (2006.01)
*B25J 9/16* (2006.01)
(Continued)

(52) U.S. Cl.
CPC ..... *B25J 9/0093* (2013.01); *B25J 9/1697* (2013.01); *G05B 19/4182* (2013.01);
(Continued)

(58) Field of Classification Search
CPC ... B25J 9/1697; B25J 9/0093; G05B 19/4182; G05B 2219/39102; G05B 2219/39241; Y02P 90/02; B65G 47/1421
See application file for complete search history.

(56) References Cited

U.S. PATENT DOCUMENTS 4,680,802 A 7/1987 Nishida et al.
5,489,019 A * 2/1996 DiNanno ..... B65G 47/1492 193/25 FT
(Continued)

FOREIGN PATENT DOCUMENTS

EP 0 916 457 A2 5/1999
EP 1 897 663 A2 3/2008
(Continued)

OTHER PUBLICATIONS

Reznik D and John Canny: "A Flat Rigid Plate is a Universal Planar Manipulator"; Proceedings of the 1998 IEEE International Conference on Robotics & Automation; Leuven, Belgium; May 1998; pp. 1471-1477 (7 pages).
(Continued)

*Primary Examiner* — Deandra M Hughes

(57) ABSTRACT

A control apparatus that controls a robot system including a part feeder having a container that accommodates a part and a plurality of vibration actuators for vibrating the container, and a robot having an end effector for picking up a part from the container, the apparatus comprising: a processor that is configured to execute computer-executable instructions so as to control the part feeder and the robot, wherein the processor is configured to select one or more control commands from a plurality of control commands respectively including control parameters of the plurality of vibration actuators and transmits the selected control command to the part feeder for causing the part feeder to perform an operation according to the selected control command.

17 Claims, 34 Drawing Sheets

FIG. 6

(51) Int. Cl.

*G05B 19/418* (2006.01)

*B65G 47/14* (2006.01)

(52) U.S. Cl.

CPC ..... *B65G 47/1421* (2013.01); *G05B 2219/39102* (2013.01); *G05B 2219/39241* (2013.01)

(56) References Cited

U.S. PATENT DOCUMENTS

| | | | | |
|---|---|---|---|---|
| 6,056,108 | A * | 5/2000 | Buchi | B25J 9/1697 198/395 |
| 8,550,233 | B2 | 10/2013 | Perroud et al. | |
| 10,654,169 | B2 * | 5/2020 | Oowatari | B65G 47/52 |
| 10,899,001 | B2 * | 1/2021 | Sirkett | B25J 9/1612 |
| 10,926,962 | B2 * | 2/2021 | Farrell | B65G 47/1421 |
| 10,974,908 | B2 * | 4/2021 | Dicristofano | B65G 27/32 |
| 11,565,889 | B2 * | 1/2023 | Kinoshita | B25J 9/0096 |
| 11,774,964 | B2 * | 10/2023 | Iwamoto | B60T 7/16 701/2 |
| 2010/0063629 | A1 | 3/2010 | Battisti et al. | B25J 9/1697 700/259 |
| 2011/0284344 | A1 * | 11/2011 | Perroud | B65G 27/34 198/752.1 |
| 2015/0066200 | A1 * | 3/2015 | McCarthy | B07C 5/3422 700/223 |

FOREIGN PATENT DOCUMENTS

| | | | |
|---|---|---|---|
| JP | 60-200385 | A | 10/1985 |
| JP | 64-005742 | A | 1/1989 |
| JP | 2016-204135 | A | 12/2016 |

OTHER PUBLICATIONS

Patakota Venkata Prasad Reddy et al., "A Review on Importance of Universal Gripper in Industrial Robot Applications", International Journal of Mechanical Engineering and Robotics Research, vol. 2, No. 2, Apr. 2, 2013, pp. 255-264, XP055521908.

Extended European Search Report for Application No. EP 18 17 5990 dated Nov. 23, 2018 (17 pages).

Anonymous, "Detection of Multiple Instances of a Object in Open CV?", Retrieved from the Internet, URL:https://web.archive.org/web/20150616024144/https://stackoverflow.com/questions/12804035/detection-of-multiple-instances-of-a-object-in-opencv, Jun. 16, 2015, XP055522761, the whole document.

* cited by examiner

PART COORDINATE LIST 234

| No. | X | Y |
|---|---|---|
| 1 | X1 | Y1 |
| 2 | X2 | Y2 |
| 3 | X3 | Y3 |
| 4 | X4 | Y4 |
| 5 | X5 | Y5 |
| 7 | X7 | Y7 |
| 8 | X8 | Y8 |
| 12 | X12 | Y12 |
| 15 | X15 | Y15 |
| 16 | X16 | Y16 |
| 18 | X18 | Y18 |

FIG.14A

PART COORDINATE LIST 234

| No. | X | Y |
|---|---|---|
| 1 | X1 | Y1 |
| 2 | X2 | Y2 |
| 3 | X3 | Y3 |
| 4 | X4 | Y4 |
| 5 | X5 | Y5 |
| 7 | X7 | Y7 |
| 8 | X8 | Y8 |
| 12 | X12 | Y12 |
| 15 | X15 | Y15 |
| 16 | X16 | Y16 |
| 18 | X18 | Y18 |
| 6 | X6 | Y6 |
| 9 | X9 | Y9 |
| 11 | X11 | Y11 |
| 13 | X13 | Y13 |
| 19 | X19 | Y19 |

FIG.14B

PART COORDINATE LIST 234

| No. | X | Y |
|---|---|---|
| 1 | X1 | Y1 |
| 2 | X2 | Y2 |
| 3 | X3 | Y3 |
| 4 | X4 | Y4 |
| 5 | X5 | Y5 |
| 7 | X7 | Y7 |
| 8 | X8 | Y8 |
| 12 | X12 | Y12 |
| 15 | X15 | Y15 |
| 16 | X16 | Y16 |
| 18 | X18 | Y18 |
| 6 | X6 | Y6 |
| 9 | X9 | Y9 |
| 11 | X11 | Y11 |
| 13 | X13 | Y13 |
| 19 | X19 | Y19 |
| 14 | X14 | Y14 |

FIG.14C

FIG.17

| No. | STATE NAME | DESCRIPTION | ON PLATFORM |
|---|---|---|---|
| 1 | PICKABLE | PARTS ARE DISPERSED IN PICKABLE STATE | ROBOT HOPPER |
| 2 | EMPTY | THERE IS NO PART | ROBOT HOPPER |
| 3 | UNEVENLY DISTRIBUTED PICK POSITION | PARTS ARE UNEVENLY DISTRIBUTED AT END PORTION OF PLATFORM | ROBOT HOPPER |
| 4 | EXCESSIVELY LARGE NUMBER OF REMAINING PARTS | REMAINING NUMBER OF PARTS IS EQUAL TO OR GREATER THAN 20% | ROBOT HOPPER |
| 5 | EXCESSIVELY SMALL NUMBER OF REMAINING PARTS | REMAINING NUMBER OF PARTS IS LESS THAN 20% | ROBOT HOPPER |
| 6 | EXCESSIVELY LARGE NUMBER OF REMAINING BACKWARD-FACING PARTS | REMAINING NUMBER OF BACKWARD-FACING PARTS IS EQUAL TO OR GREATER THAN 10% | ROBOT HOPPER |
| 7 | NO PICKABLE PARTS | THERE ARE NO PARTS THAT CAN BE PICKED UP ALTHOUGH PARTS EXIST (STATE WHERE ONLY ANOTHER TYPE OF PART EXIST, etc) | ROBOT HOPPER |

CONTROL APPARATUS AND ROBOT SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS REFERENCE TO RELATED APPLICATIONS*

*This application is an application for reissue of U.S. Pat. No. 10,894,316, which is issued from U.S. applicaton Ser. No. 16/000,084, filed on Jun. 5, 2018, which claims the benefit of Japanese Patent Application Nos. 2017-111275, filed on Jun. 6, 2017 and 2017-214446 filed on Nov. 7, 2017.*

BACKGROUND

1. Technical Field

The present invention relates to control of a robot system that handles a part (component).

2. Related Art

JP-A-60-200385 discloses a technique in which a robot picks up a part (component) from a part feeder and performs assembly work. In the related art, the part in a swivel part feeder is imaged by a camera, and presence or absence, a position, and a posture of the part are recognized by an image process. Then, the robot executes a grasp and the assembly work of the part based on a recognition result.

However, there is a problem that a dedicated part feeder is required according to a type and a shape of the part in the related art. There is also a problem that it may be difficult to improve the efficiency of work of picking up the part from the part feeder since a common part feeder can only perform a simple operation.

SUMMARY

An advantage of some aspects of the invention is to solve at least a part of the problems described above, and the invention can be implemented as the following aspects.

(1) According to a first aspect of the invention, there is provided a control apparatus that controls a robot system including a part feeder having a part accommodating unit that accommodates a part and a plurality of vibration actuators for vibrating the part accommodating unit, and a robot having an end effector for picking up a part from the part accommodating unit. The control apparatus includes a part feeder control unit that controls the part feeder and a robot control unit that controls the robot. The part feeder control unit selects one or more control commands from a plurality of control commands respectively including control parameters of the plurality of vibration actuators and transmits the selected control command to the part feeder for causing the part feeder to perform an operation according to the selected control command.

According to the control apparatus, since one or more control commands from the plurality of control commands respectively including the control parameters of the plurality of vibration actuators are selected and the selected control command is transmitted to the part feeder, it is possible to transmit the control parameters suitable for the operation of the part feeder to the part feeder. As a result, it is possible to appropriately operate the part feeder according to a type and a shape of the part. Alternatively, it is possible to improve the efficiency of work of picking up the part from the part feeder.

(2) In the control apparatus, the plurality of control commands may include a separation command for causing the part feeder to execute a separation operation to separate a plurality of parts gathered in the part accommodating unit.

According to the control apparatus, it is possible to improve the efficiency of the work of picking up the part from the part feeder by separating the parts from each other using the separation command.

(3) In the control apparatus, the plurality of control commands may include a posture change command for causing the part feeder to execute a posture change operation to change a posture of a part in the part accommodating unit.

According to the control apparatus, it is possible to improve the efficiency of the work of picking up the part by changing the posture of the part using the posture change command.

(4) In the control apparatus, each of the separation command and the posture change command may be a command to vibrate the plurality of vibration actuators, and a vibration continuing period of the vibration actuator in the separation command may be set longer than in the posture change command.

According to the control apparatus, since the vibration continuing period of the vibration actuator in the separation command is set longer than in the posture change command, it is possible to separate the parts successfully.

(5) In the control apparatus, an image recognition unit that executes image recognition for recognizing a part in the part accommodating unit using an image acquired by a camera that captures an image of the part in the part accommodating unit may be further included, and the part feeder control unit may select one or more control commands from the plurality of control commands using a result of the image recognition and transmit the selected control command to the part feeder.

According to the control apparatus, since the part in the part accommodating unit is recognized by the image recognition, it is possible to transmit the control command according to the recognized result to the part feeder to operate the part feeder appropriately.

(6) In the control apparatus, the image recognition unit may virtually divide a part accommodating region of the part accommodating unit into a plurality of partitions including a replenishment partition that receives replenishment of a part from a part replenishment apparatus and a picking partition in which the end effector picks up a part. In a case where existence of a part in the picking partition is recognized by the image recognition, the robot control unit may control the robot so as to pick up the recognized part by the end effector. In a case where no existence of a part in the picking partition is recognized by the image recognition, the part feeder control unit may transmit a feed command to move a part from a partition other than the picking partition to the picking partition to the part feeder.

According to the control apparatus, since the part accommodating region is virtually divided into the plurality of partitions including the replenishment partition and the picking partition and the part is picked up from the picking partition, it is possible to improve the efficiency of the work of picking up the part. In a case where no existence of a part in the picking partition is recognized by the image recognition, since the part is moved from the partition other than the picking partition to the picking partition, it is possible to move the part appropriately to the picking partition.

(7) In the control apparatus, in a case where existence of only a part that is not capable of picking up in the picking partition is recognized by the image recognition, the part feeder control unit may transmit the posture change command to change the posture of the part to the part feeder.

According to the control apparatus, it is possible to change the posture of the part from a posture that is not capable of picking up to a posture that is capable of picking up by the posture change command.

(8) In the control apparatus, the plurality of partitions may further include an intermediate partition provided between the replenishment partition and the picking partition, and the feed command may cause the part feeder to execute an operation of moving a part existing in the replenishment partition to the intermediate partition and moving a part existing in the intermediate partition to the picking partition.

According to the control apparatus, it is possible to move the part appropriately in an order of the replenishment partition, the intermediate partition, and the picking partition using the feed command. It is also possible to effectively perform the pick-up work of the part in the picking partition and the replenishment work of the part to the replenishment partition.

(9) In the control apparatus, the part accommodating unit may include a part accommodating region and an outer peripheral wall provided on the outer periphery of the part accommodating region, and an interference region where a gripping mechanism of the end effector interferes with the outer peripheral wall may exist in an outer periphery portion of the part accommodating region. The part feeder control unit may separate parts by a separation command and then transmit a centering command to move a part existing in the interference region toward the inside of the part accommodating region to the part feeder.

According to the control apparatus, since the interference between the gripping mechanism of the end effector and the outer peripheral wall can be reduced, it is possible to improve the efficiency of the pick-up work of the part.

(10) In the control apparatus, the image recognition unit may execute a setting process of setting additional regions used by a gripping mechanism of the end effector for gripping a part in a plurality of places of the outer edge of each part in an image acquired by the camera and a recognition process of recognizing a part in which the additional regions thereof do not overlap with another part as a grippable part in the image. The robot control unit may control the robot so as to grip and pick up the grippable part with the gripping mechanism of the end effector.

According to the control apparatus, since the grippable part is recognized in consideration of the additional regions used by a gripping mechanism of the end effector for gripping the part, it is possible to prevent a part that cannot be gripped by the gripping mechanism from being recognized as the part to be gripped and improve the efficiency of the pick-up work of the part.

(11) In the control apparatus, the image recognition unit may execute an image update process of updating the image by deleting the grippable part from the image after the recognition process and a repetition process of the recognition process and the image update process using the updated image, and register an order in which each part is recognized as the grippable part when the recognition process and the image update process are repeated. The robot control unit may control the robot so as to grip and pick up the part with the gripping mechanism of the end effector according to the order.

According to the control apparatus, since more parts can be recognized as the grippable part by repeating the recognition process and the image update process, it is possible to improve the efficiency of the pick-up work of the part.

(12) In the control apparatus, the end effector may have a first pick-up mechanism and a second pick-up mechanism. At this time, the image recognition unit may execute a process of recognizing one part among parts existing in the picking partition as a first pickable part with the first pick-up mechanism and a process of recognizing a second pickable part with the second pick-up mechanism in a state of holding the first pickable part with the first pick-up mechanism.

According to the control apparatus, it is possible to improve the efficiency of the work of picking up the part using the two pick-up mechanisms.

(13) In the control apparatus, the image recognition unit may respectively calculate a pick-up cost with respect to one or more parts that are capable of picking up with the second pick-up mechanism according to a predetermined calculation method and select the second pickable part according to the pick-up cost, in a state of holding the first pickable part with the first pick-up mechanism in the process of recognizing the second pickable part.

According to the control apparatus, it is possible to improve the efficiency of gripping the part with the second pick-up mechanism.

(14) In the control apparatus, the control parameters may include a frequency of a vibration signal to be supplied to the vibration actuator, amplitude of the vibration signal, and a vibration continuing time.

According to the control apparatus, since it is possible to cause the part feeder to perform an operation suitable for the type of the part according to the frequency and the amplitude of the vibration signal, and the vibration continuing time, it is possible to improve the efficiency of the pick-up work of the part.

(15) In the control apparatus, a non-volatile memory for storing in advance the control parameters of the plurality of vibration actuators may be further included. The control parameters stored in the non-volatile memory may include (a) balance of vibration intensity between the plurality of vibration actuators, (b) a frequency of the vibration signal that is capable of activating a motion of a part existing in the part accommodating unit, and (c) amplitude of the vibration signal that is capable of preventing a part existing in the part accommodating unit from jumping out of the part accommodating unit.

According to the control apparatus, since appropriate control parameters are stored in advance in the non-volatile memory, it is possible to effectively operate the part feeder using the control parameters and improve the efficiency of the pick-up work of the part.

(16) According to a second aspect of the invention, there is provided a robot system including apart feeder having a part accommodating unit that accommodates a part and a plurality of vibration actuators for vibrating the part accommodating unit; a robot having an end effector for picking up a part from the part accommodating unit; and the control apparatus which is connected to the part feeder and the robot.

According to the robot system, it is also possible to appropriately operate the part feeder according to the type and the shape of the part. Alternatively, it is possible to improve the efficiency of work of picking up the part from the part feeder.

The invention can be realized in various aspects other than the above. For example, the invention can be realized in an aspect such as a computer program for realizing functions of the control apparatus and a non-transitory storage medium in which the computer program is recorded.

BRIEF DESCRIPTION OF THE DRAWINGS

The invention will be described with reference to the accompanying drawings, wherein like numbers reference like elements.

FIG. 14A is an explanatory diagram of a part coordinate list.

FIG. 14B is an explanatory diagram of an updated part coordinate list.

FIG. 14C is an explanatory diagram of a further updated part coordinate list.

FIG. 17 is an explanatory diagram illustrating an example of a platform state obtained by image recognition.

DESCRIPTION OF EXEMPLARY EMBODIMENTS

A. First Embodiment

Figure 1:
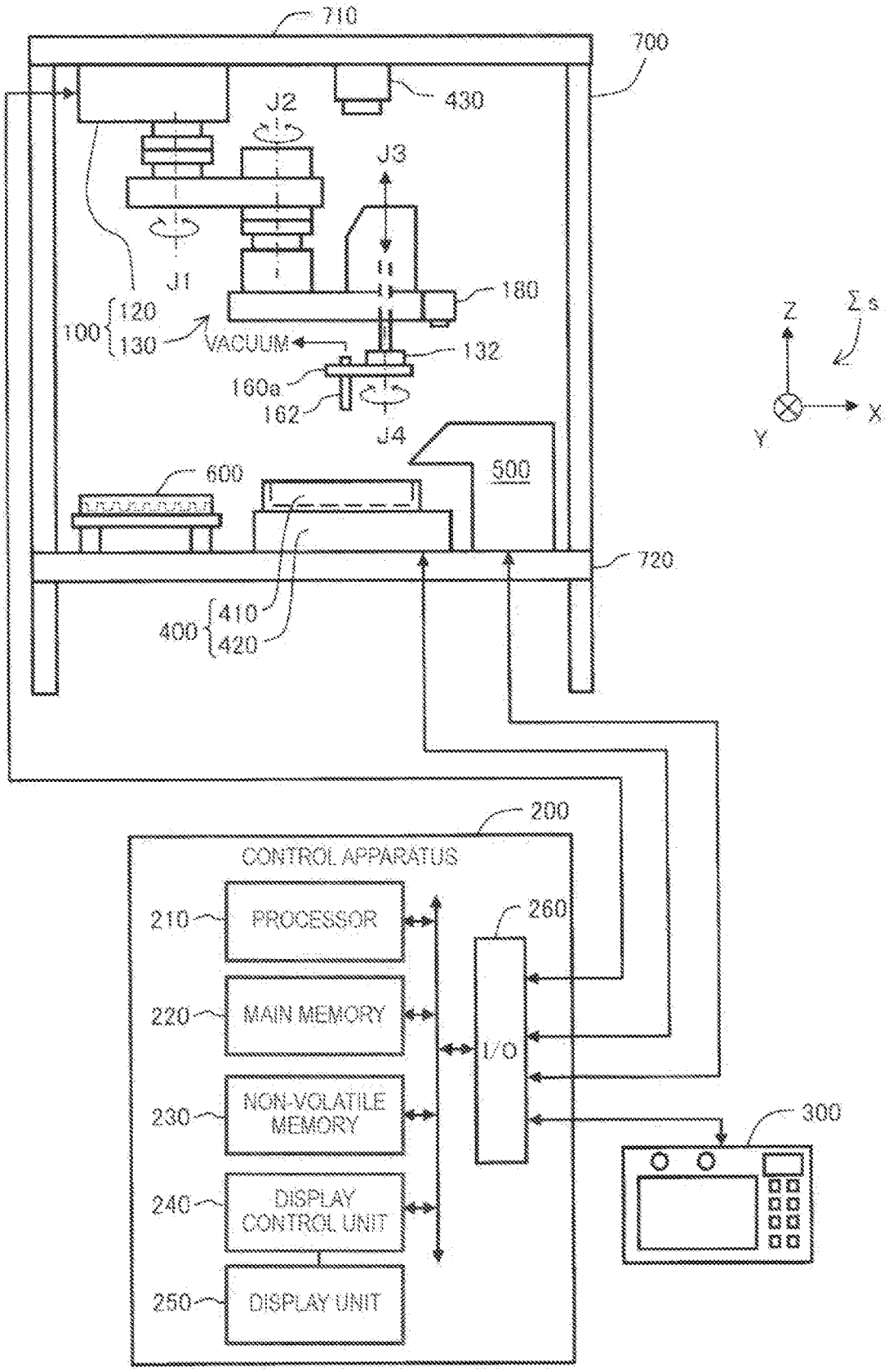
FIG. 1 is a conceptual diagram of a robot system in a first embodiment.

FIG. 1 is a conceptual diagram of a robot system in a first embodiment. The robot system is mounted on a stand 700 and includes a robot 100, a control apparatus 200, a teaching pendant 300, a part feeder 400, a hopper 500, and a part tray 600. The robot 100 is fixed under a top plate 710 of the stand 700. The part feeder 400, the hopper 500, and the part tray 600 are mounted on a table portion 720 of the stand 700. The robot 100 is a teaching playback type robot. The work using the robot 100 is executed according to teaching data created in advance. A system coordinate system Σs defined by three coordinate axes X, Y, and Z orthogonal to each other is set in the robot system. In an example of FIG. 1, X-axis and Y-axis are in the horizontal direction, and Z-axis is in the vertical upper direction. A teaching point included in the teaching data and a posture of an end effector are expressed by a coordinate value of the system coordinate system Σs and an angle around each axis.

The robot 100 includes a base 120 and an arm 130. The arm 130 is sequentially connected by four joints J1 to J4. The three joints J1, J2, and J4 are torsional joints, and one joint J3 is a translational joint among the joints J1 to J4. A four-axis robot is exemplified in the embodiment, but it is possible to use a robot having an optional arm mechanism including one or more joints.

An end effector 160a is attached to an arm end 132 which is a tip end portion of the arm 130. In the example of FIG. 1, the end effector 160a is an adsorption pick-up mechanism having an adsorption nozzle 162 that vacuum-adsorbs a part. A camera 180 is further attached to the arm 130. The camera 180 is used when a part required to be picked up is selected when a part is picked up by the end effector 160a. However, the camera 180 can be omitted.

The part feeder 400 includes a part accommodating unit 410 that accommodates the part and a vibration unit 420 that vibrates the part accommodating unit 410. The part accommodating unit 410 is, for example, a container. A camera 430 for capturing an image of the part in the part accommodating unit 410 is mounted under the top plate 710 of the stand 700.

The hopper 500 is a part replenishment apparatus that replenishes the part to the part feeder 400. In the specification, the term "hopper" is not limited to an apparatus having a funnel shape and is used as a term indicating an apparatus to replenish the part.

The part tray 600 is a tray having a large number of recessed portions for individually accommodating parts. In the embodiment, the robot 100 picks up the part from the part accommodating unit 410 of the part feeder 400 and executes work of storing the part in an appropriate position in the part tray 600. However, the robot system can be also employed in a case of performing another work other than the above work.

The control apparatus 200 includes a processor 210, a main memory 220, a non-volatile memory 230, a display control unit 240, a display unit 250, and an I/O interface 260. Each of units is connected through a bus. The processor 210 is, for example, a microprocessor or a processor circuit. The control apparatus 200 is connected to the robot 100, the teaching pendant 300, the part feeder 400, and the hopper 500 through the I/O interface 260. The control apparatus 200 is further connected to cameras 180 and 430 through the I/O interface 260.

As a configuration of the control apparatus 200, it is possible to employ various configurations other than the configuration illustrated in FIG. 1. For example, the processor 210 and the main memory 220 may be removed from the control apparatus 200 of FIG. 1, and the processor 210 and the main memory 220 may be provided in another apparatus connected to the control apparatus 200 in a communicable manner. In this case, the entire apparatus including another apparatus and the control apparatus 200 functions as the control apparatus of the robot 100. In another embodiment, the control apparatus 200 may include two or more processors 210. In still another embodiment, the control apparatus 200 may be realized by a plurality of apparatuses connected to each other in a communicable manner. In the various embodiments, the control apparatus 200 is configured as an apparatus including one or more processors 210 or a group of apparatuses.

The teaching pendant 300 is a type of a robot teaching apparatus used when human teaching worker teaches an operation of the robot 100. The teaching pendant 300 includes a processor and a memory (not illustrated). Teaching data created by the teaching using the teaching pendant 300 is stored in the non-volatile memory 230 of the control apparatus 200.

Figure 2:
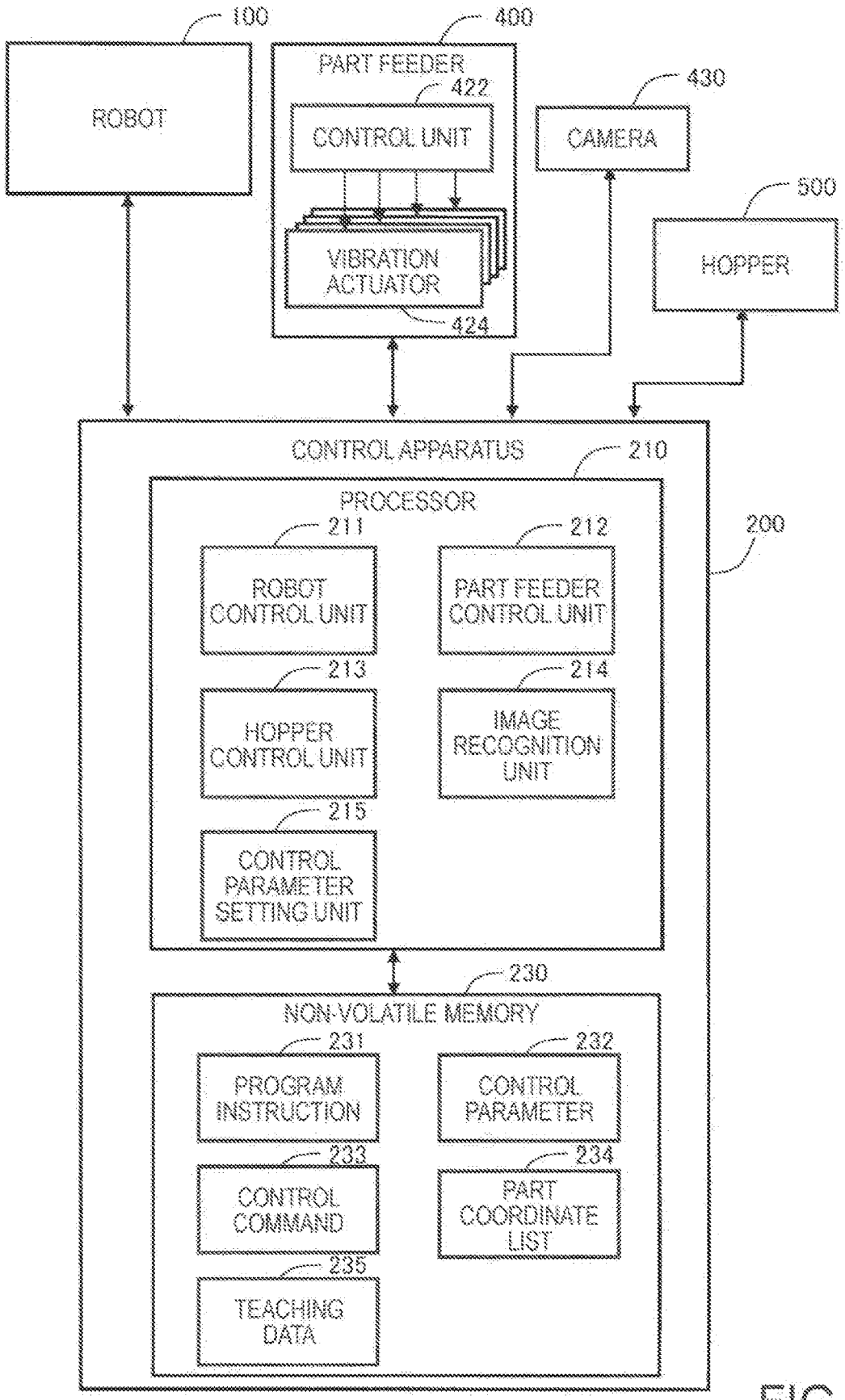
FIG. 2 is a block diagram illustrating functions of a control apparatus.

FIG. 2 is a block diagram illustrating functions of the control apparatus 200. The processor 210 of the control apparatus 200 executes various program instructions 231 stored in advance in the non-volatile memory 230 to respectively realize the functions of a robot control unit 211, a part feeder control unit 212, a hopper control unit 213, an image recognition unit 214, and a control parameter setting unit 215. The functions of above units 211 to 215 will be described below. The part feeder 400 includes a control unit 422 and a plurality of vibration actuators 424. The plurality of vibration actuators 424 are vibrators that vibrate the part accommodating unit 410 (FIG. 1).

The non-volatile memory 230 stores a control parameter 232 and a control command 233 of the vibration actuator 424, and a part coordinate list 234 in addition to the program instruction 231 and teaching data 235. The control parameter 232, the control command 233, and the part coordinate list 234 will be described below. The robot control unit 211, the part feeder control unit 212, and the hopper control unit 213 control the work of each unit according to the teaching data 235.

Figure 3:
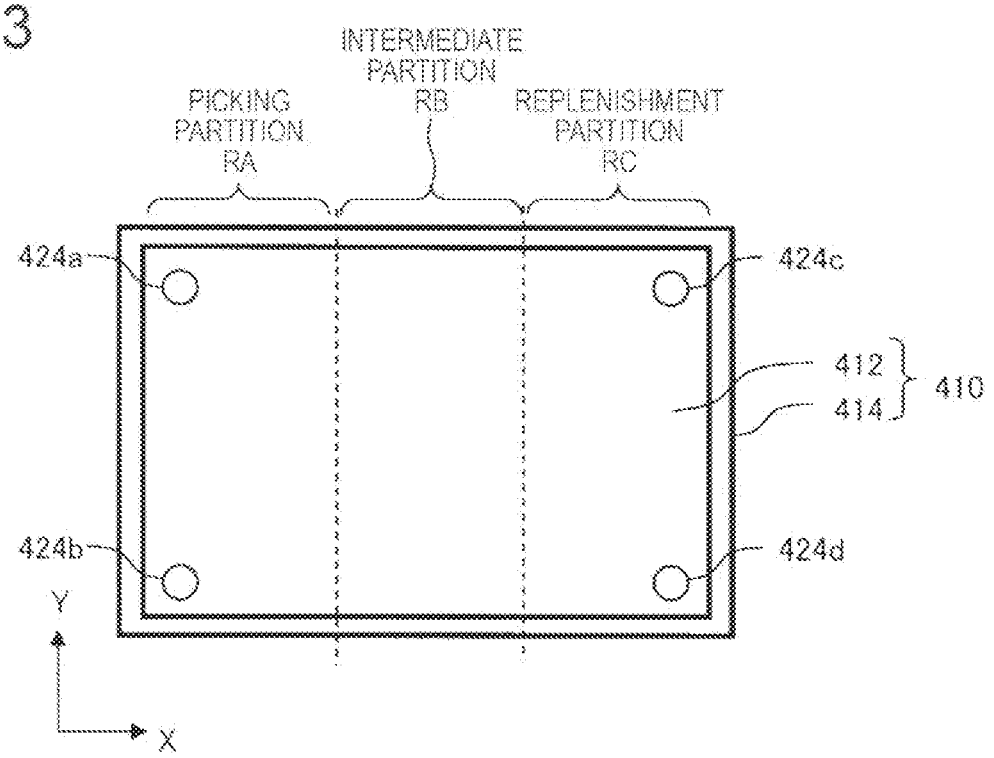
FIG. 3 is a plan view of a part accommodating unit.

FIG. 3 is a plan view of the part accommodating unit 410. The part accommodating unit 410 includes a part accommodating region 412 and an outer peripheral wall 414 provided on the outer periphery of the part accommodating region 412 and extending in the Z direction. The part accommodating region 412 is a flat substantially rectangular region. In the example, the X direction is the longitudinal direction of the part accommodating region 412, and the Y direction is the transverse direction of the part accommodating region 412. It is preferable to maintain a surface of the part accommodating region 412 horizontally in order to stably accommodate the part. The part accommodating region 412 is also referred to as "platform". The plurality of vibration actuators 424a to 424d are mounted under the part accommodating region 412. Open circles indicating the vibration actuators 424a to 424d indicate planar positions of the vibration actuators 424a to 424d under the part accommodating region 412. Actually, the vibration actuators 424a to 424d are mounted under the part accommodating region 412 in an invisible state. Here, the number of the vibration actuators is four, and the vibration actuators are mounted at four corners of the part accommodating region 412. However, the number of the vibration actuators is not limited to four, and the optional number of vibration actuators may be provided.

The small letters "a" to "d" attached to the end of the reference signs of the plurality of vibration actuators 424a to 424d are additional reference signs attached in order to distinguish each vibration actuator. The "a" at the end of the reference sign of the end effector 160a is also an additional reference sign attached in order to distinguish the end effector 160a from the end effector used in another embodiment. In the following description, "a" to "d" and the like are omitted in a case where such additional sign is unnecessary.

The part accommodating region 412 is divided into three virtual partitions RA, RB, and RC. It is preferable that boundary lines between adjacent partitions are set parallel to the transverse direction (Y direction) of the part accommodating region 412. A picking partition RA is a partition where the end effector 160a picks up the part. A replenishment partition RC is a partition that receives the replenishment of the part from the hopper 500. The intermediate partition RB is a partition provided between the picking partition RA and the replenishment partition RC. It is preferable that widths (dimension in the X direction) of the partitions are set to be equal to each other. Specifically, when an average value of the widths of the plurality of partitions RA to RC is 100%, it is preferable that the width of each partition is in a range of 100%±10%.

It is preferable to select a partition having the shortest takt time of the work of the robot 100 among the plurality of partitions RA to RC as the picking partition RA. In this manner, it is possible to maximize the work efficiency of the robot 100. In the embodiment, the "takt time" is a time required for one piece of work in a case where the work in which the robot 100 picks up apart from the part feeder 400 and stores the part in the part tray 600 is repeated a plurality of times. A partition closest to the part tray 600 is commonly selected as the picking partition RA among the plurality of partitions RA to RC.

The number of partitions provided in the part accommodating region 412 is not limited to three and may be two or four or more. Alternatively, the part accommodating region 412 may be not divided into the plurality of partitions. However, when the part accommodating region 412 is divided into the plurality of partitions, it is possible to improve the efficiency of the work of the robot 100. The boundary lines of the plurality of partitions are set parallel to the transverse direction (X direction) in the example of FIG. 3, but the boundary lines of the plurality of partitions may be set parallel to the longitudinal direction (Y direction) instead of the example. Alternatively, the boundary lines parallel to the transverse direction (X direction) and the boundary lines parallel to the longitudinal direction (Y direction) may be respectively set as the boundary lines of the plurality of partitions. Specifically, for example, the plurality of partitions may be disposed in a 2×2 checkerboard form.

The part feeder 400 is configured to be able to perform various operations according to various control commands transmitted from the part feeder control unit 212 of the control apparatus 200. Each control command is configured to include, for example, the following control parameters.

(1) Frequency of vibration signal
(2) Amplitude of vibration signal
(3) Phase of vibration signal
(4) Vibration continuing time The "vibration signal" is a signal provided from the control unit 422 of the part feeder 400 to each vibration actuator 424, and each vibration actuator 424 vibrates according to the vibration signal.

A waveform of the vibration signal suitable for each operation also exists as the control parameter of the vibration actuator 424. The waveform of the vibration signal selected by each control command is stored in advance, for example, in a non-volatile memory (not illustrated) in the control unit 422 (FIG. 2) of the part feeder 400. In this case, the control unit 422 selects the waveform of the vibration signal according to the control command supplied from the control apparatus 200. However, a control command including parameters for selecting one waveform from waveforms of a plurality of types of vibration signals stored in the control unit 422 may be transmitted from the control apparatus 200 to the control unit 422 of the part feeder 400.

In the following description, a feed command, a separation command, a flip command, and a centering command will be described as representative control commands. The control parameter of the vibration actuator 424 is also referred to as "vibration parameter".

Figure 4A:
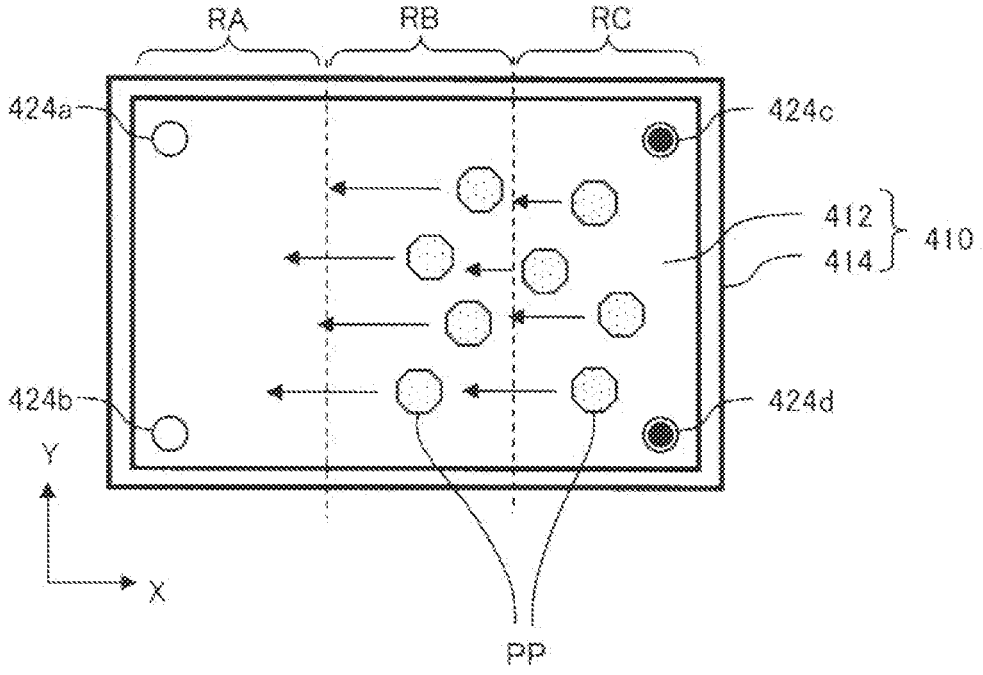
FIG. 4A is an explanatory diagram illustrating a feed operation by a feed command.

FIG. 4A is an explanatory diagram illustrating a feed operation by the feed command. Among the plurality of vibration actuators 424a to 424d, vibration actuators having black circles added in the open circles vibrate in the feed operation, and vibration actuators having no added black circles do not vibrate. This is also the same as in another operation to be described below. In the feed operation, the two vibration actuators 424c and 424d at the right end of the longitudinal direction (X direction) of the part accommodating region 412 vibrate, and the two vibration actuators 424a and 424b at the left end thereof do not vibrate. The two operating vibration actuators 424c and 424d vibrate with the same phase. As a result, a part PP in the part accommodating region 412 moves in a direction from the right to the left (−X direction). For example, it is possible to operate the part feeder 400 such that a part PP existing in the intermediate partition RB moves to the picking partition RA and a part PP existing in the replenishment partition RC moves to the intermediate partition RB by executing the feed command once.

The control parameters included in the feed command are, for example, as follows.

(1) Frequency of vibration signal: frequency (for example, resonance frequency of part accommodating region 412) at which the motion of the parts PP can be activated.
(2) Amplitude of vibration signal: amplitude at which the parts PP can be moved so as to slide on the part accommodating region 412.
(3) Phase of vibration signal: the same phase in the plurality of vibration actuators 424.
(4) Vibration continuing time: time during which the parts PP can be moved from one partition to adjacent partition.

Figure 4B:
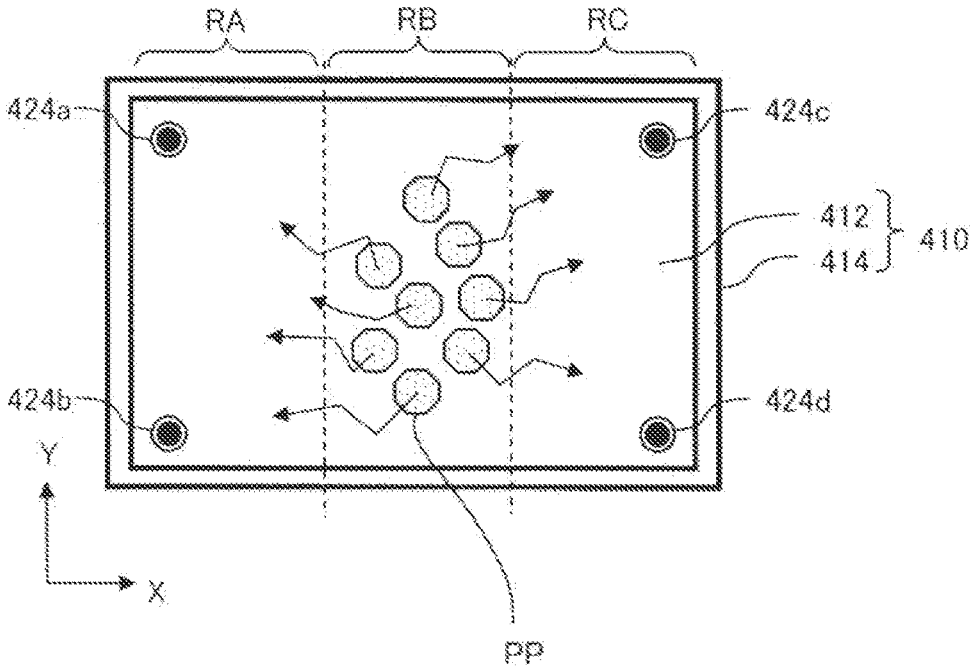
FIG. 4B is an explanatory diagram illustrating a separation operation by a separation command.

FIG. 4B is an explanatory diagram illustrating a separation operation by the separation command. The plurality of vibration actuators 424a to 424d simultaneously operate in the separation operation. The four vibration actuators 424a to 424d vibrate in the same phase. In the separation operation, it is possible to separate a plurality of parts PP gathered in the part accommodating region 412. The efficiency of work of picking up the part from the part feeder 400 can be improved by separating the parts PP from each other using such a separation command.

The control parameters included in the separation command are, for example, as follows.

(1) Frequency of vibration signal: frequency (for example, resonance frequency of part accommodating region 412) at which the motion of the parts PP can be activated.
(2) Amplitude of vibration signal: amplitude as large as possible within a limit in which the parts PP do not jump out of the part accommodating region 412.
(3) Phase of vibration signal: the same phase in the plurality of vibration actuators 424.
(4) Vibration continuing time: time during which the parts PP gathered in the intermediate partition RB can be almost uniformly dispersed in the plurality of partitions RA to RC.

Figure 4C:
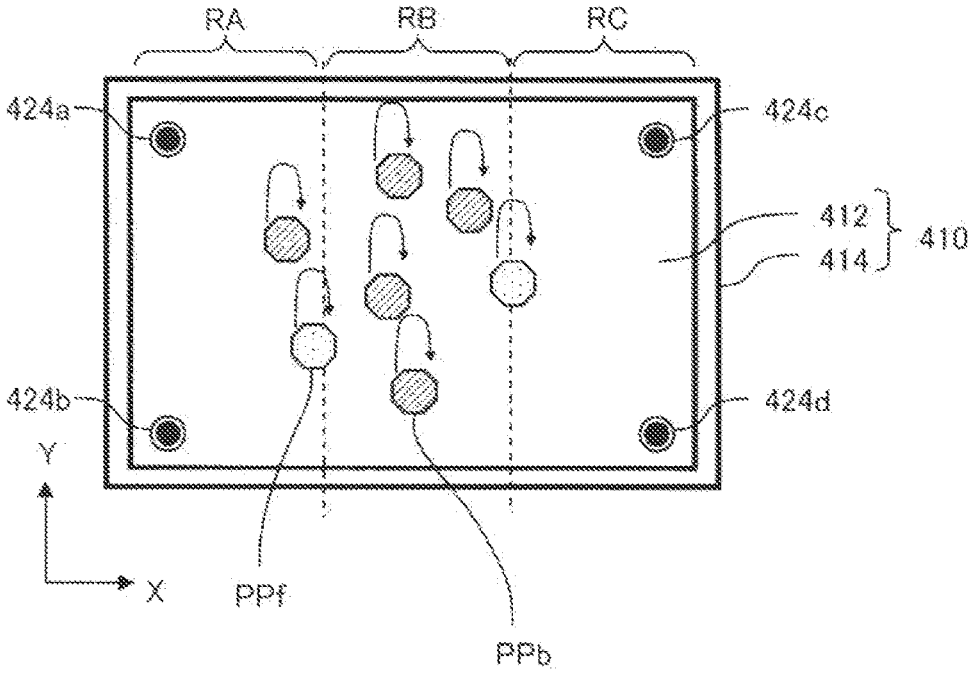
FIG. 4C is an explanatory diagram illustrating a flip operation by a flip command.

FIG. 4C is an explanatory diagram illustrating a flip operation by the flip command. The plurality of vibration actuators 424a to 424d simultaneously operate in the flip operation. The four vibration actuators 424a to 424d vibrate in the same phase. In the flip operation, it is possible to invert the part PP in the part accommodating region 412. A sandy pattern part PPf is a forward-facing part, and a shaded hatching part PPb is a backward-facing part. The flip operation is an operation to invert the parts PP.

The control parameters included in the flip command are, for example, as follows.

(1) Frequency of vibration signal: frequency (for example, resonance frequency of part accommodating region 412) at which the motion of the parts PP can be activated.

(2) Amplitude of vibration signal: amplitude as large as possible within a limit in which the parts PP do not jump out of the part accommodating region 412.

(3) Phase of vibration signal: the same phase in the plurality of vibration actuators 424.

(4) Vibration continuing time: time when it is as short as possible and the number of inverted parts PP increases.

In the flip command, the vibration continuing period is set shorter than in the separation command. That is, the vibration continuing period of the vibration actuator 424 in the separation command is set longer than in the flip command.

It is preferable that a waveform of the vibration signal supplied to the vibration actuator 424 according to the flip command is a waveform that can invert the part PP.

The flip command is a type of a posture change command that changes a posture of the part PP. As the posture change command other than the flip command, it is possible to use, for example, a rotation command that rotates the part PP on the surface of the part accommodating region 412. The part PP rotates around the vertical direction (Z direction) in a rotation operation by the rotation command. For example, as in another embodiment described below, there is a case where the posture change command other than the flip command such as the rotation command is effective when the part PP is picked up using a gripping mechanism that grips the part PP. When the posture of the part PP is changed using the posture change command, it is possible to improve the efficiency of the work of picking up the part PP.

When the separation command and the posture change command such as the flip command are used, it is possible to improve the efficiency of the work of picking up the part. Since the vibration continuing period of the vibration actuators in the separation command is set longer than in the posture change command such as the flip command, it is possible to separate the parts successfully.

Figure 4D:
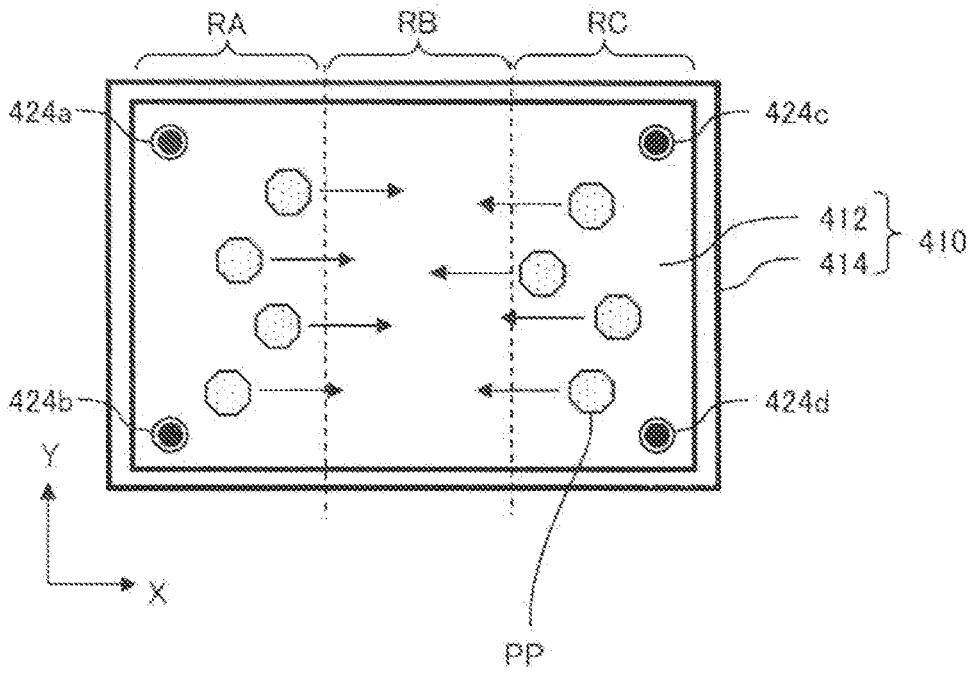
FIG. 4D is an explanatory diagram illustrating a centering operation by a centering command.

FIG. 4D is an explanatory diagram illustrating a centering operation by the centering command. The plurality of vibration actuators 424a to 424d simultaneously operate in the centering operation. In the centering operation of FIG. 4D, the vibration actuators 424a and 424b at one end portion in the X direction vibrate at a phase different by 180° from the vibration actuators 424c and 424d at the other end portion in the X direction in order to move the parts PP to the center of the longitudinal direction (X direction) of the part accommodating region 412. As another centering operation, it is also possible to move the parts PP to the center of the transverse direction (Y direction) of the part accommodating region 412. In the centering operation, the vibration actuators 424a and 424c at one end portion in the Y direction vibrate at a phase different by 180° from the vibration actuators 424b and 424d at the other end portion in the Y direction.

The control parameters included in the centering command are, for example, as follows.

(1) Frequency of vibration signal: frequency (for example, resonance frequency of part accommodating region 412) suitable to activate the motion of the parts PP.

(2) Amplitude of vibration signal: amplitude as large as possible within a limit in which the parts PP do not jump out of the part accommodating region 412.

(3) Phase of vibration signal: opposite phases between the vibration actuator 424 at one end portion and the vibration actuator 424 at the other end portion.

(4) Vibration continuing time: time suitable for a purpose of the centering operation.

As the "purpose of the centering operation", it is possible to set two different purposes, for example, (a) gathering the parts PP at the center of part accommodating region 412 as a pre-process of the separation operation described in FIG. 4B and (b) moving the parts PP existing in an interference region (will be described in third embodiment) which is in the outer periphery of the part accommodating region 412 to the inside of the part accommodating region 412 after the separation operation. The vibration continuing times in the centering operations having the different purposes are set to appropriate times according to the respective purposes.

The part feeder control unit 212 selects one or more control commands from the plurality of control commands respectively including the control parameters of the plurality of vibration actuators 424 and transmits the selected control command to the part feeder 400 for causing the part feeder 400 to perform an operation according to the selected control command. Accordingly, it is possible to transmit the control parameters suitable for the operation of the part feeder 400 to the part feeder 400. As a result, it is possible to appropriately operate the part feeder 400 according to a type and a shape of the part PP. Alternatively, it is possible to improve the efficiency of the work of picking up the part PP from the part feeder 400.

The control parameters suitable for each control command are stored in the non-volatile memory 230 set in advance by the control parameter setting unit 215 before the robot 100 performs the pick-up work of the part PP. An initial setting of such control parameters will be described after various embodiments relating to the pick-up work of the part PP.

FIGS. 5A to 5H are explanatory diagrams illustrating states where the parts move in the part accommodating region 412 in the pick-up work of the part PP by the robot 100. The illustration of the vibration actuator 424 is omitted in FIGS. 5A to 5H.

Figure 5A:
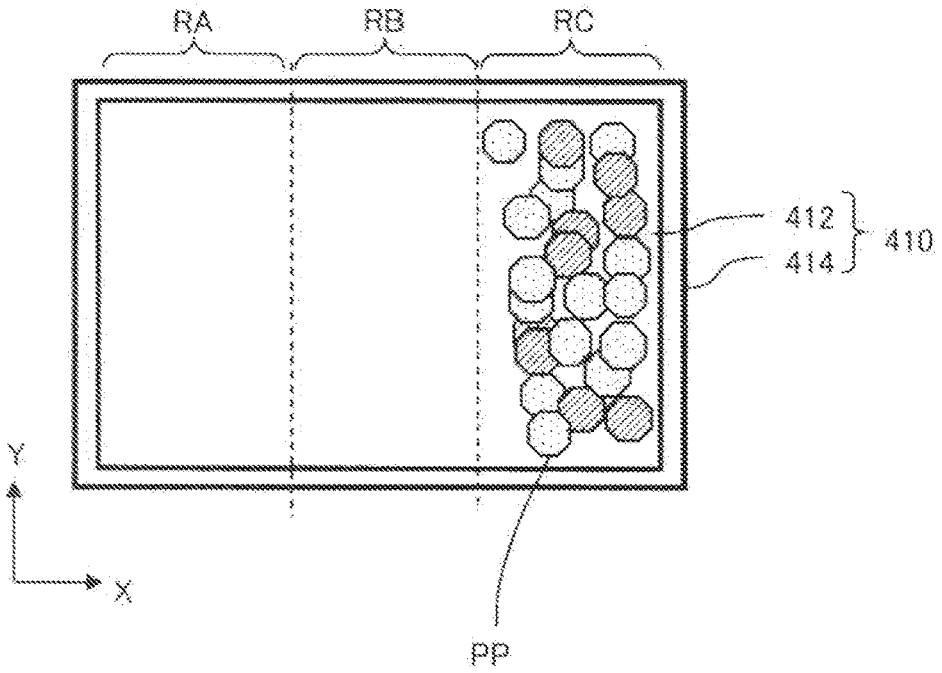
FIG. 5A is an explanatory diagram illustrating a state of an initial replenishment of parts to a part accommodating region.
Figure 5B:
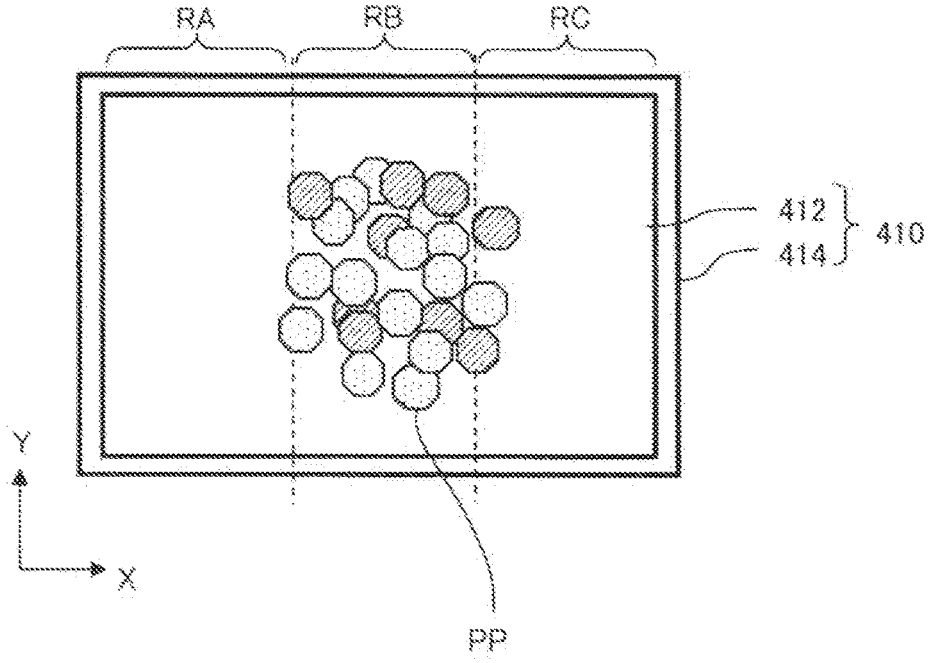
FIG. 5B is an explanatory diagram illustrating a result of the centering operation of the parts.
Figure 5C:
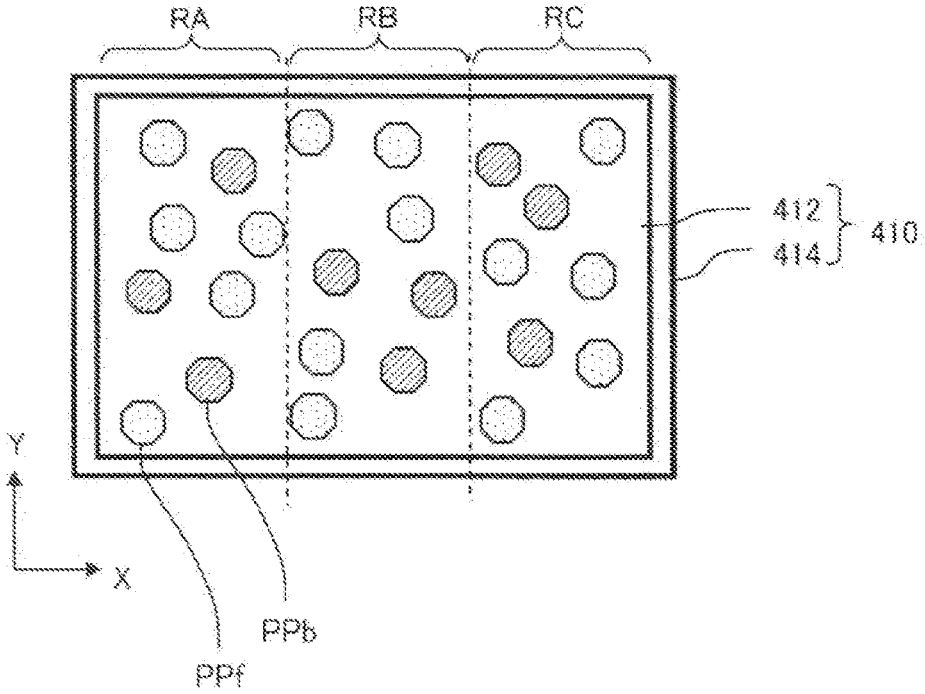
FIG. 5C is an explanatory diagram illustrating a result of the separation operation of the parts.

FIG. 5A illustrates an initial state where parts PP are initially replenished from the hopper 500 to the part accommodating region 412. The hopper 500 replenishes a plurality of parts PP in the replenishment partition RC. The sandy pattern parts PP are the forward-facing parts, and the shaded hatching parts PP are the backward-facing parts. When the centering operation is performed in the state of FIG. 5A, the parts PP are gathered at the center of the part accommodating region 412 (that is, intermediate partition RB) as illustrated in FIG. 5B. Then, when the separation operation is performed, the parts PP are dispersed substantially all over the part accommodating region 412 as illustrated in FIG. 5C. In this manner, it is possible to disperse more uniformly the parts PP by performing the centering operation before the separation operation. However, there is a case where the parts PP can be uniformly dispersed only by the separation operation depending on the type and the number of parts PP, a supply method, and a supply position. In such a case, the centering operation may be omitted. In the state of FIG. 5C, there commonly exist the forward-facing parts PPf and the backward-facing parts PPb in each of partitions RA, RB, and RC. The work of the robot 100 in the embodiment is to pick up the forward-facing parts PPf and to store the parts in the part tray 600. Detection of the forward-facing parts PPf and the backward-facing parts PPb is performed by the image recognition unit 214 executing an image recognition process on an image acquired by the camera 430.

Figure 5D:
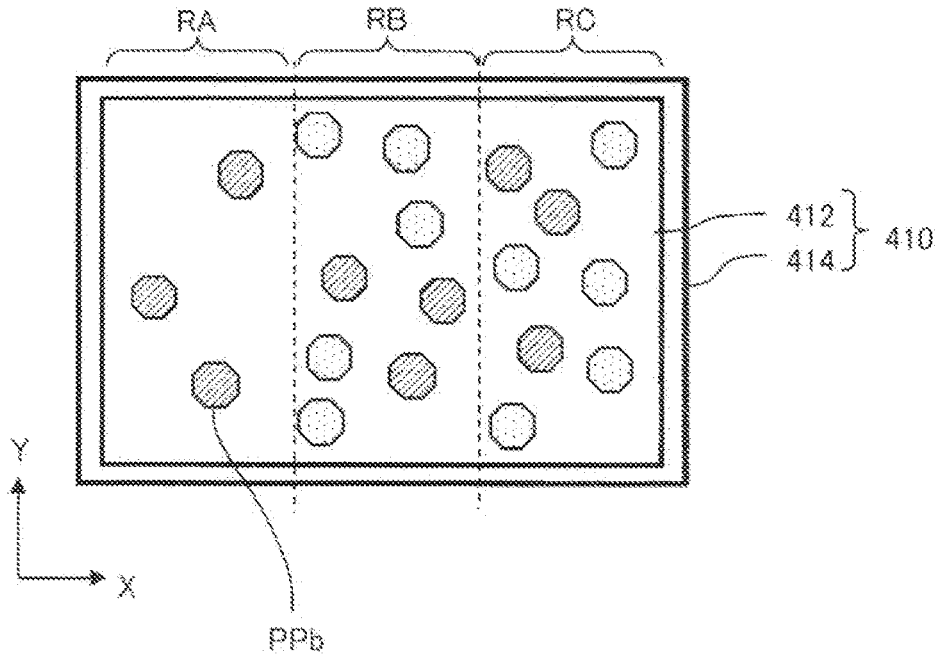
FIG. 5D is an explanatory diagram illustrating a state of picking up the parts.
Figure 5E:
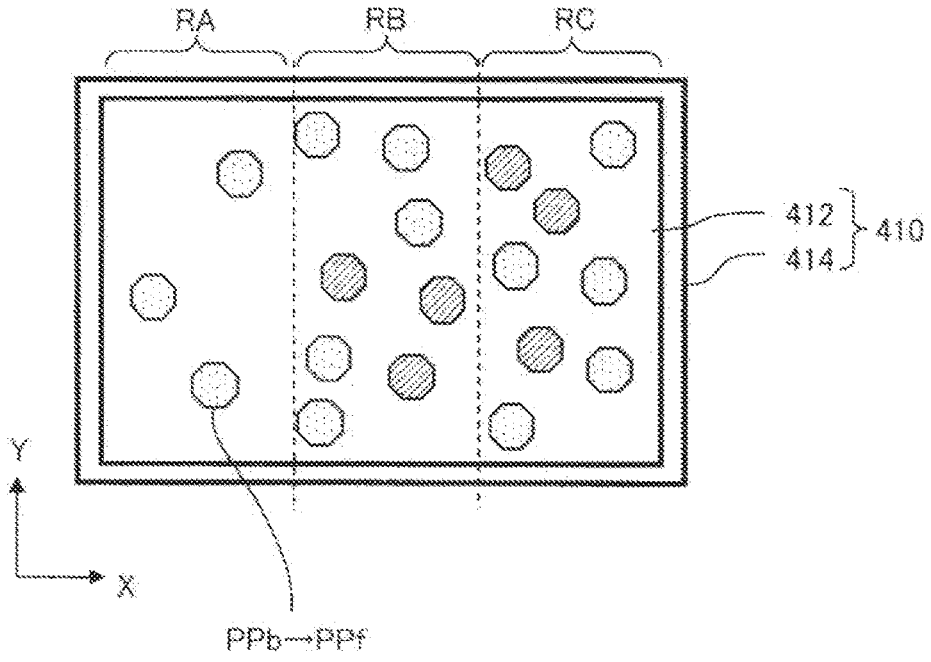
FIG. 5E is an explanatory diagram illustrating a result of the flip operation of the parts.

FIG. 5D illustrates a state where the robot 100 picks up all the forward-facing parts PPf existing in the picking partition RA from the state of FIG. 5C. Next, when the flip operation is performed and the backward-facing parts PPb are turned forward-facing, a state of FIG. 5E is obtained. In FIG. 5E, the parts PP existing in the partitions RB and RC are in the same state as in FIG. 5D to simplify the figure. However, the parts PP in the partitions RB and RC are actually inverted by the flip operation. The parts PPf which are turned forward-facing by the flip operation are picked up from the picking partition RA by the robot 100. The flip operation and the pick-up operation of the parts PP are repeated until the picking up of all the parts PP in the picking partition RA is completed.

Figure 5F:
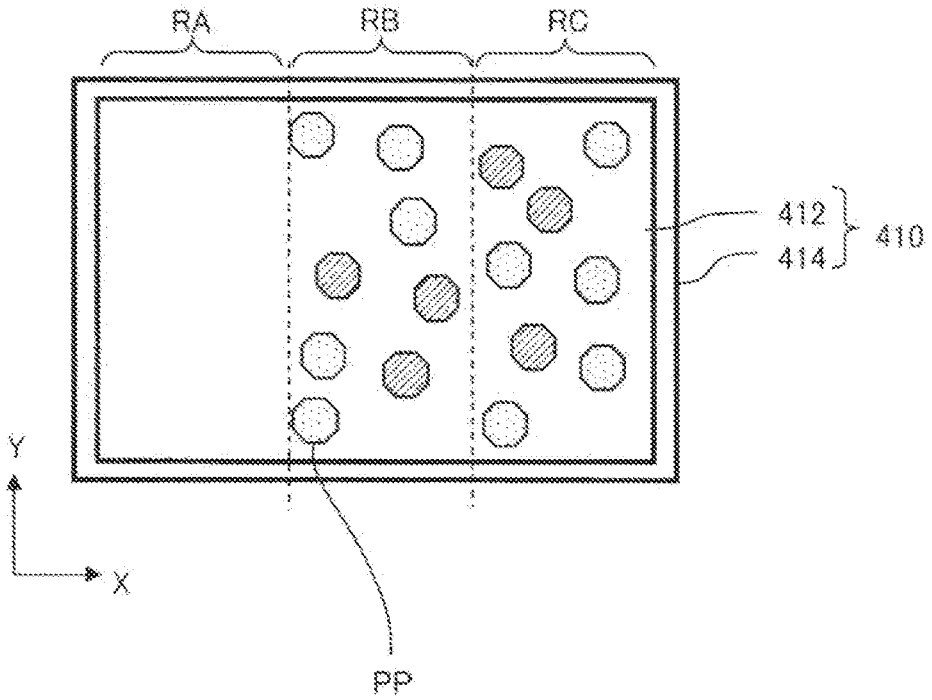
FIG. 5F is an explanatory diagram illustrating the state of picking up the parts.
Figure 5G:
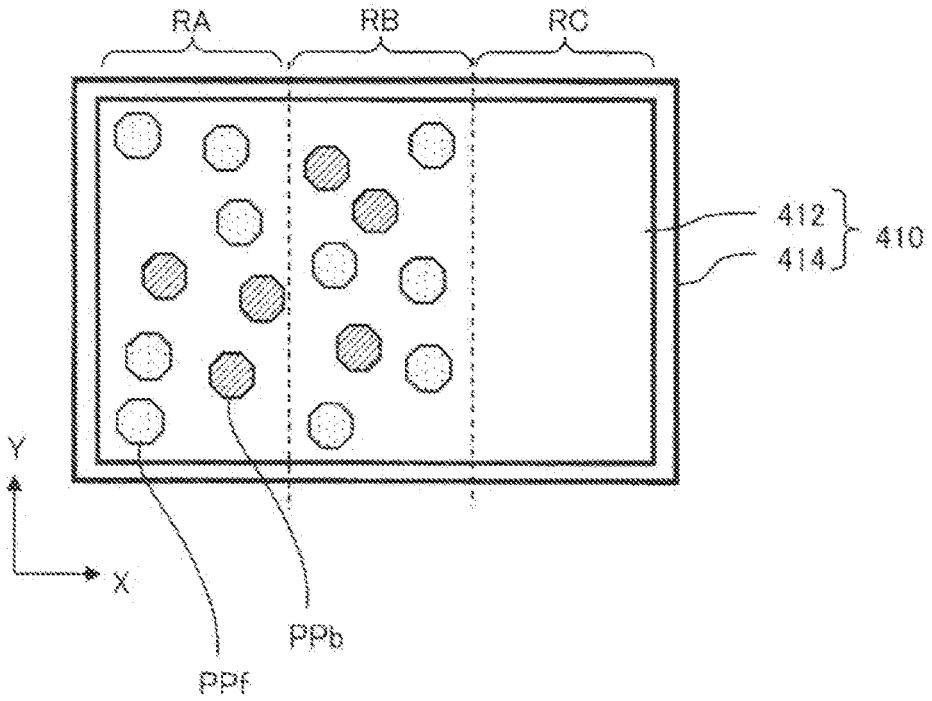
FIG. 5G is an explanatory diagram illustrating a result of the feed operation of the parts.

FIG. 5F illustrates a state where the picking up of all the parts PP in the picking partition RA is completed. Next, when the feed operation is performed and the parts PP in the part accommodating region 412 are moved in a direction of the picking partition RA, a state of FIG. 5G is obtained. The feed operation is executed so as to move the parts PP from respective partitions RB and RC to respective adjacent partitions RA and RB. Then, the pick-up operation and the flip operation of the parts PP described in FIGS. 5C to 5F are performed with respect to the parts PP existing in the picking partition RA, and all the parts PP in the picking partition RA are picked up. In the state of FIG. 5G, since there is no part PP in the replenishment partition RC, the part PP may be replenished from the hopper 500 to the replenishment partition RC in parallel with the pick-up operation and the flip operation of the parts PP in the picking partition RA.

Figure 5H:
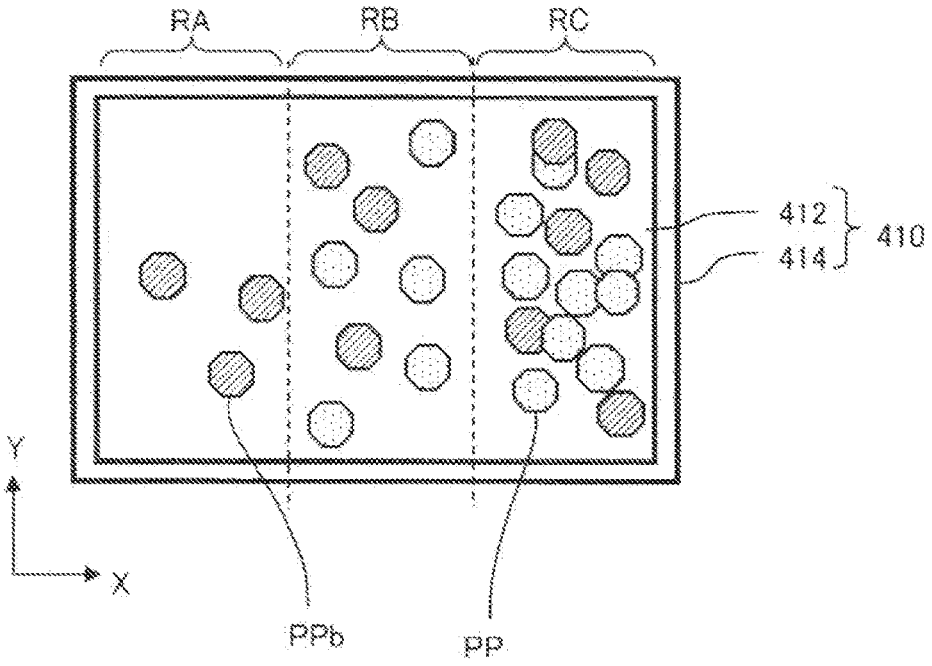
FIG. 5H is an explanatory diagram illustrating the state of picking up and replenishing the parts.
Figure 5I:
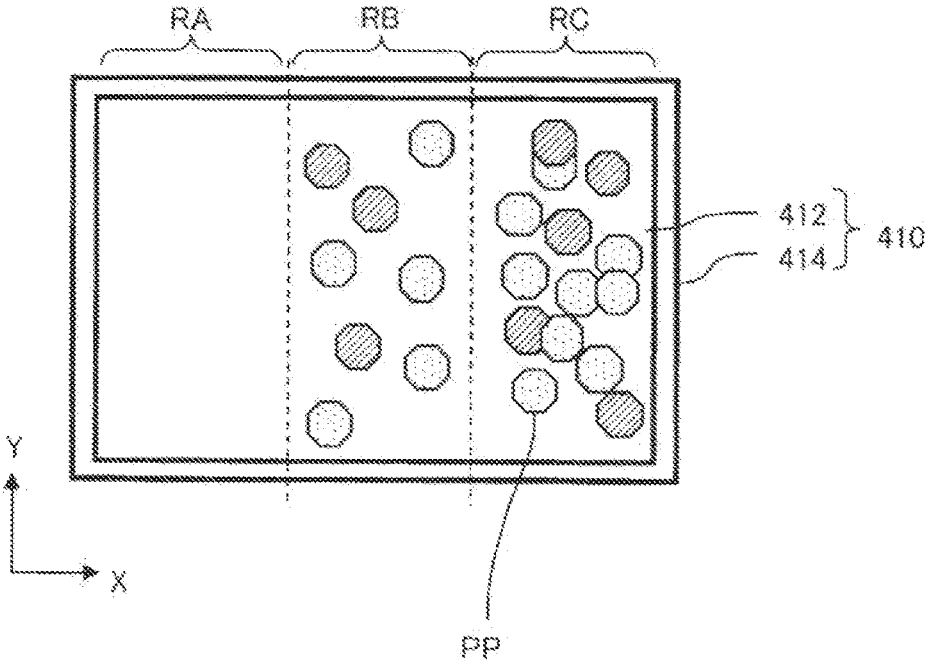
FIG. 5I is an explanatory diagram illustrating the state of picking up the parts.
Figure 5J:
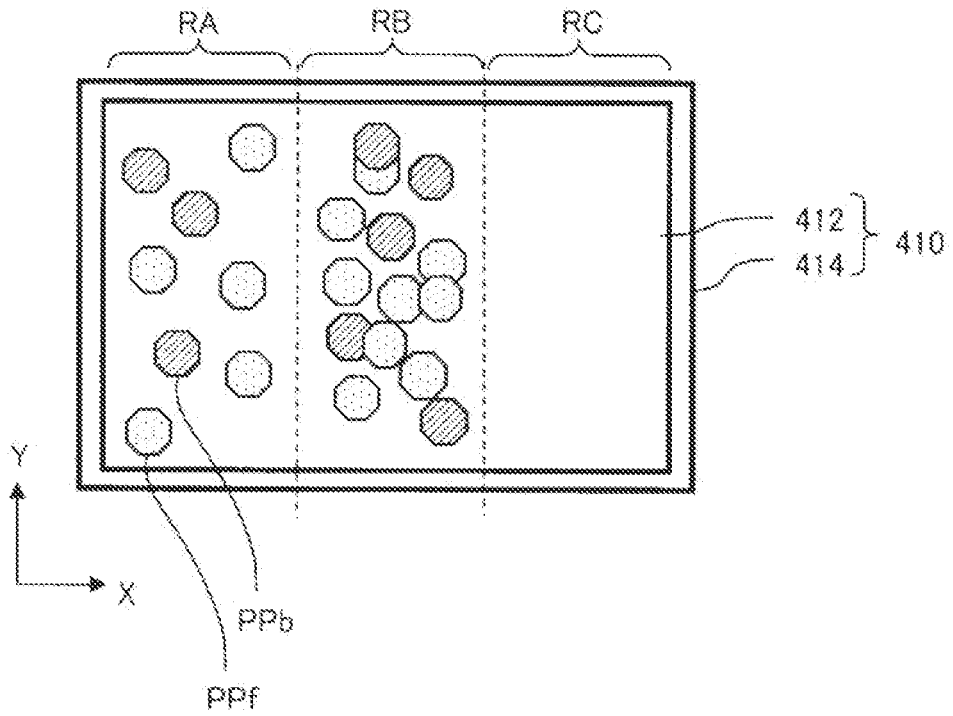
FIG. 5J is an explanatory diagram illustrating the state of the feed operation of the parts.

FIG. 5H illustrates a state where the picking up of the forward-facing parts PPf in the picking partition RA in FIG. 5G is completed and the parts PP are replenished to the replenishment partition RC. When all the parts PP existing in the picking partition RA are picked up by repeating the flip operation and the pick-up operation of the parts PP from the state of FIG. 5H if necessary, a state of FIG. 5I is obtained. Next, when the feed operation is performed and the parts PP in the part accommodating region 412 are moved in the direction of the picking partition RA, a state of FIG. 5J is obtained. Then, the pick-up operation and the flip operation of the parts PP described in FIGS. 5C to 5F are performed with respect to the parts PP existing in the picking partition RA, and all the parts PP in the picking partition RA are picked up. In the state of FIG. 5J, similarly to the state of FIG. 5G, since there is no part PP in the replenishment partition RC, the part PP may be replenished from the hopper 500 to the replenishment partition RC in parallel with the pick-up operation and the flip operation of the parts PP in the picking partition RA.

Figure 5K:
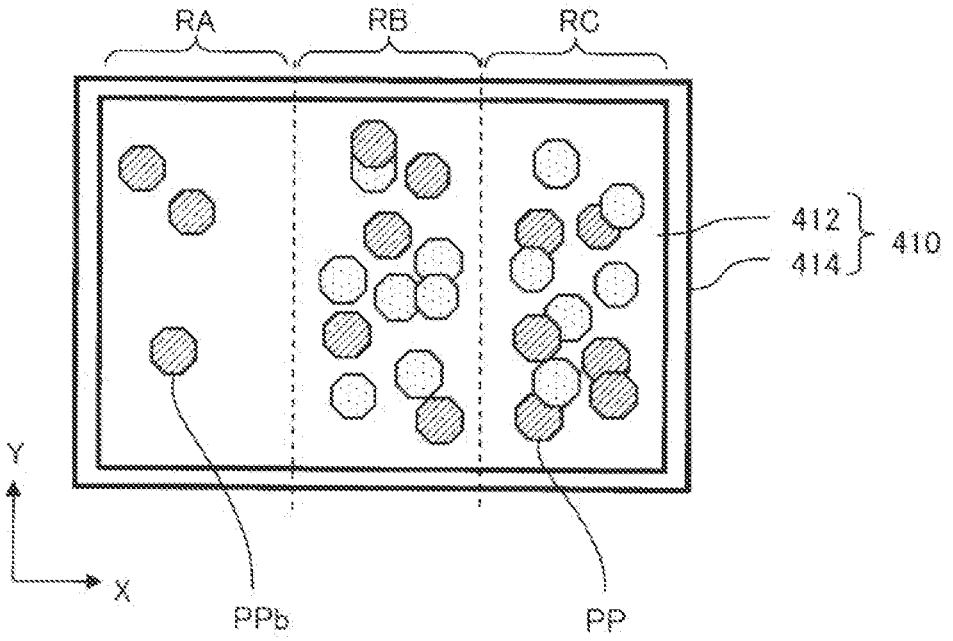
FIG. 5K is an explanatory diagram illustrating the state of picking up and replenishing the parts.

FIG. 5K illustrates a state where the picking up of the forward-facing parts PPf in the picking partition RA in FIG. 5J is completed and the parts PP are replenished to the replenishment partition RC. The parts PP existing in the intermediate partition RB in FIG. 5K are the parts replenished to the replenishment partition RC in FIG. 5I. The number of parts PP replenished to the replenishment partition RC respectively in FIGS. 5I and 5K is experimentally determined in advance and stored in the non-volatile memory 230. In the embodiment, the number of replenishments per time is set, for example, to a value of ½ of the number of initial replenishments in FIG. 5A. In a case where the part accommodating region 412 is divided into $N_{412}$ ($N_{412}$ is integer of two or more) partitions, it is preferable that the number of replenishments per time after the second time is commonly set to a value of $1/(N_{412}-1)$ of the number of initial replenishments.

The number of parts PP picked up from the part accommodating region 412 may be used as the number of replenishments instead of setting the number of replenishments of the parts PP to a constant value. Specifically, the number of parts PP picked up during a period from a previous replenishment time to a current replenishment time may be the number of replenishments. In this manner, since the number of parts PP existing in the part accommodating region 412 after the replenishment is constant, the efficiency of the pick-up work improves.

Figure 5L:
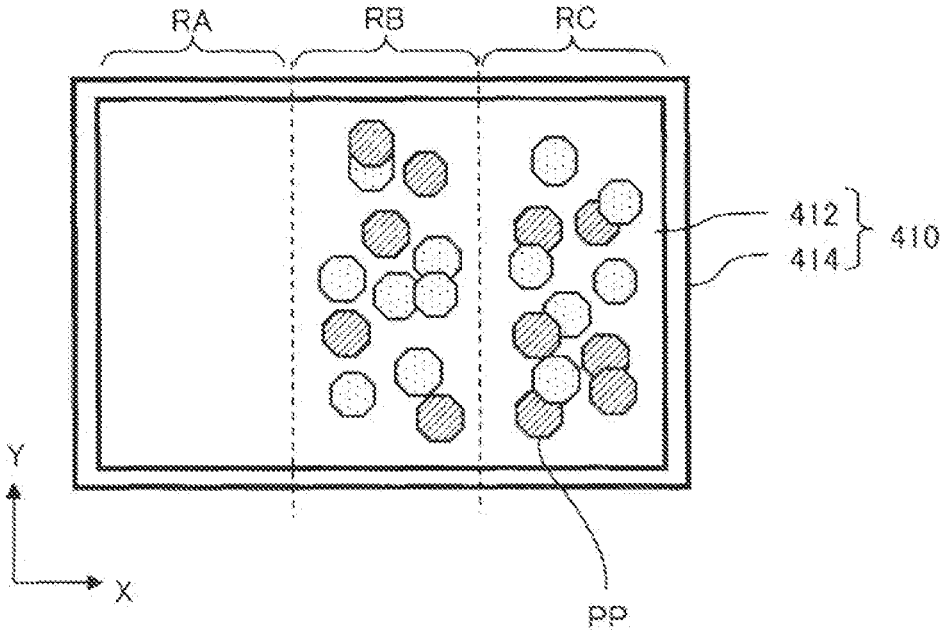
FIG. 5L is an explanatory diagram illustrating the state of picking up the parts.

When all the parts PP existing in the picking partition RA are picked up by repeating the flip operation and the pick-up operation of the parts PP from the state of FIG. 5K if necessary, a state of FIG. 5L is obtained. The same operations (that is, various operations after centering operation) as the operations described in FIGS. 5B to 5K are executed after FIG. 5L. In this manner, since the pick-up work of the part PP can be executed while appropriately replenishing the part PP in the part feeder 400, it is possible to effectively perform the pick-up work of the part PP.

Figure 6:
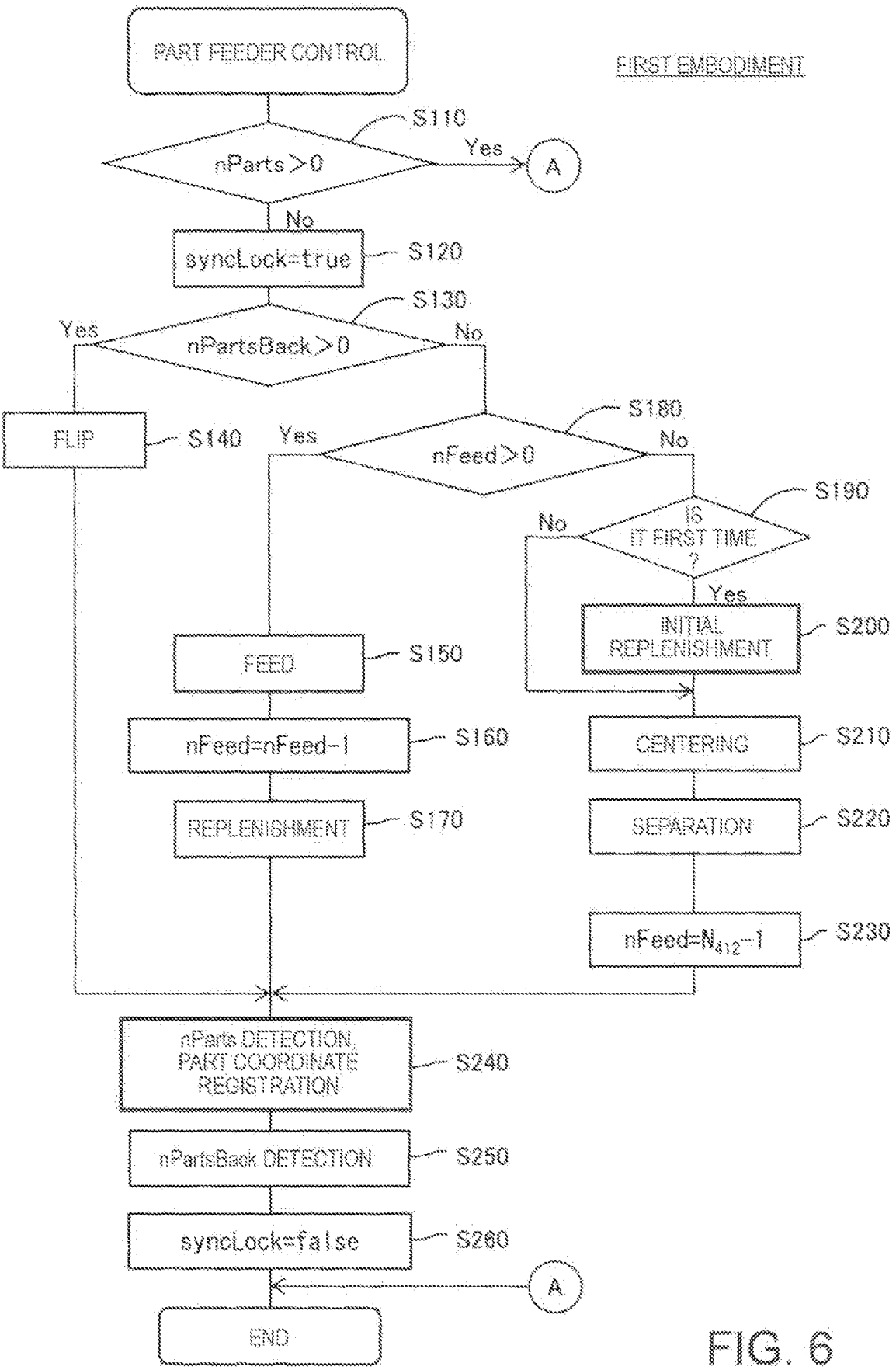
FIG. 6 is a flowchart of part feeder control in the first embodiment.

FIG. 6 is a flowchart of part feeder control in the first embodiment. The control is executed by the part feeder control unit 212 unless otherwise stated. The control of FIG. 6 is repeatedly executed, for example, for each constant time.

Parameters used in FIG. 6 are as follows.

nParts: The detected number of forward-facing parts PPf in the picking partition RA.

nPartsBack: The detected number of backward-facing parts PPb in the picking partition RA.

syncLock: Synchronous control parameter of the part feeder control and robot control. The pick-up operation of the robot 100 is prohibited in a case where syncLock is true, and the pick-up operation of the robot 100 is permitted in a case where syncLock is false.

nFeed: Counter value of the feed operation.

$N_{412}$: The number of partitions of the part accommodating region 412. The $N_{412}=3$ in the embodiment.

In step S110, it is determined whether the detected number nParts of forward-facing parts PPf in the picking partition RA is one or more. The nParts is a value detected in step S240 described below, and an initial value (default value) thereof is zero. In a case where the nParts is one or more, a process of FIG. 6 is ended, and the pick-up operation of the parts PP by the robot 100 is executed. When the determination in step S110 is executed for the first time, the process proceeds to step S120 since the nParts is zero. In step S120, the synchronous control parameter syncLock is set to true, and the pick-up operation of the robot 100 is prohibited.

In step S130, it is determined whether the detected number nPartsBack of backward-facing parts PPb in the picking partition RA is one or more. The nPartsBack is a value detected in step S250 described below, and an initial value (default value) thereof is zero. In a case where the nPartsBack is one or more, the flip operation is executed in step S140, and the process proceeds to step S240. In other words, in a case where it is recognized by the image recognition that there exist only the parts PP that cannot be picked up in the picking partition RA, the flip operation to invert the parts PP is executed. In step S140, another type of posture change operation may be performed instead of the flip operation. This will be described in a third embodiment.

When the determination in step S130 is executed for the first time, the nPartsBack is zero and the process proceeds to step S180.

In step S180, it is determined whether the counter value nFeed of the feed operation is one or more. The nFeed is set in step S230 described below and a value changed in step S160, and an initial value (default value) thereof is zero. In a case where the nFeed is one or more, the process proceeds to step S150 described below. When the determination in step S180 is executed for the first time, the nFeed is zero and the process proceeds to step S190.

In step S190, it is determined whether the process after step S190 is executed for the first time. In a case where the process after step S190 is the first time, the process proceeds to step S200 and an initial part replenishment is executed from the hopper 500 to the part feeder 400. The part replenishment is the operation described in FIG. 5A and is executed by the hopper control unit 213 transmitting the control command to the hopper 500. In a case where the process after step S190 is not the first time, the process skips step S200 and proceeds to step S210.

The centering operation described in FIG. 5B is executed in step S210, and the separation operation described in FIG. 5C is executed in step S220. In step S230, the nFeed is set to ($N_{412}$−1). In the embodiment, the nFeed is two since $N_{412}$=3. After step S230, the process proceeds to step S240 described below.

Returning to step S180, in a case where the nFeed is one or more, the process proceeds to step S150. The case where the nFeed is one or more is the states in FIGS. 5F and 5I described above. In this case, the feed operation is performed in step S150, the nFeed is decremented by one in step S160, and the part replenishment is performed in step S170. The part replenishment is the operations described in FIGS. 5H and 5K. After step S170, the process proceeds to step S240. Step S170 may be executed after permitting the pick-up operation of the robot 100 in step S260 described below.

In step S240, the number nParts of forward-facing parts PPf in the picking partition RA is detected. The detection process is performed by the image recognition unit 214 executing the image recognition for recognizing the parts PP existing in the picking partition RA using an image captured by the camera 430. The image recognition can be realized, for example, by storing template images of the forward-facing part PPf and the backward-facing part PPb in the non-volatile memory 230 in advance and executing template matching with respect to the image captured by the camera 430. When a forward-facing part PPf is detected, the detected number is set as the value of nParts, and a coordinate of the detected forward-facing part PPf is registered in the part coordinate list 234 (FIG. 2). For example, a coordinate value of the system coordinate system Σs (FIG. 1) is used as the coordinate of the forward-facing part PPf. In step S250, the number nPartsBack of backward-facing parts PPb in the picking partition RA is detected. The detection process is also performed by the image recognition unit 214 executing the image recognition for recognizing the parts PP existing in the picking partition RA using an image captured by the camera 430. When a backward-facing part PPb is detected, the detected number is set as the value of nPartsBack.

In step S260, the syncLock is set to false, the pick-up operation of the robot 100 is permitted, and the process of FIG. 6 is ended.

In step S190, in a case where it is determined that the process is not the first time, the pick-up work of the parts in the picking partition RA is completed, and the number of parts in the part accommodating region 412 is small. In this case, a time during the separation operation (refer to as "separation time") in step S220 may be shorter than a separation time in the case of executing step S220 for the first time.

Figure 7:
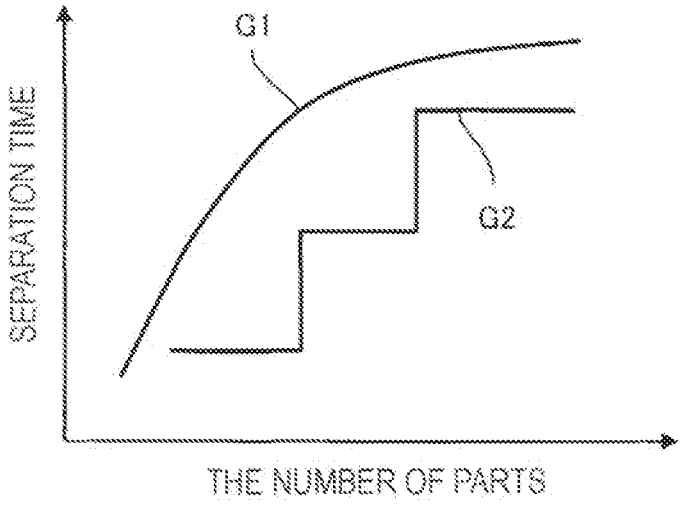
FIG. 7 is a graph illustrating a relationship between the number of parts and a separation time.

FIG. 7 illustrates examples of graphs G1 and G2 indicating a relationship between the number of parts in the part accommodating region 412 and the separation time. Both the graphs G1 and G2 indicate the characteristics that the separation time becomes shorter as the number of parts is smaller. The graph G1 is a curve projected upward, and the graph G2 is stepwise. The number of parts in the part accommodating region 412 can be obtained by the image recognition process using the camera 430 (FIG. 1). In this manner, when the separation time is set to be shorter as the number of parts in the part accommodating region 412 is smaller, the overall work time can be further shortened.

Figure 8:
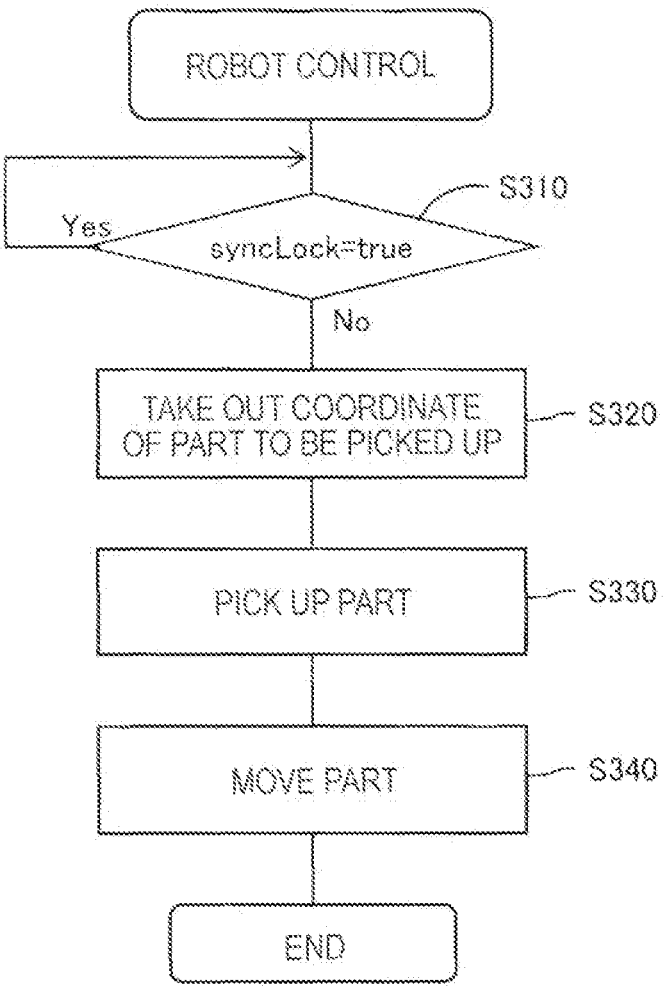
FIG. 8 is a flowchart of robot control in the first embodiment.

FIG. 8 is a flowchart of the robot control in the first embodiment. The control is executed by the robot control unit 211. The control of FIG. 8 is repeatedly executed, for example, for each constant time.

In step S310, the process waits until the syncLock changes from true (operation prohibition) to false (operation permission). In step S320, a coordinate of one part PP to be picked up by the robot 100 is taken out from the part coordinate list 234. In step S330, one part PP is picked up using an end effector 160. In step S340, the picked up part PP is moved to a target position. In the embodiment, the target position is an empty position in the part tray 600.

Process procedures described in FIGS. 6 and 8 are examples, and any changes in the process procedures can be made. For example, there is no distinction between the front and back of the part PP, steps S140 and S250 in FIG. 6 can be omitted. As described above, step S170 may be executed after step S260.

As described above, it is possible to execute the pick-up work of the part PP while appropriately replenishing the part PP in the part feeder 400 as described in FIGS. 5A to 5L by executing the part feeder control by the procedure of FIG. 6 and the robot control by the procedure of FIG. 8. As a result, it is possible to effectively perform the pick-up work of the part PP.

In the above description, the part feeder control unit 212 causes the part feeder 400 to perform various operations such as the flip operation (step S140), the feed operation (step S150), the centering operation (step S210), and the separation operation (step S220) using a result of the image recognition by the image recognition unit 214, but may cause the part feeder 400 to perform operations other than these operations. In this case, it is preferable that the part feeder control unit 212 selects one or more control commands from the plurality of control commands and transmits the selected command to the part feeder also using the result of the image recognition with respect to the image of the parts PP in the part accommodating unit 410 acquired by the camera 430. In this manner, since the part in the part accommodating unit 410 is recognized by the image recognition, it is possible to transmit an appropriate control command according to the recognized result to the part feeder 400 to operate the part feeder 400 appropriately.

B. Second Embodiment

Figure 9:
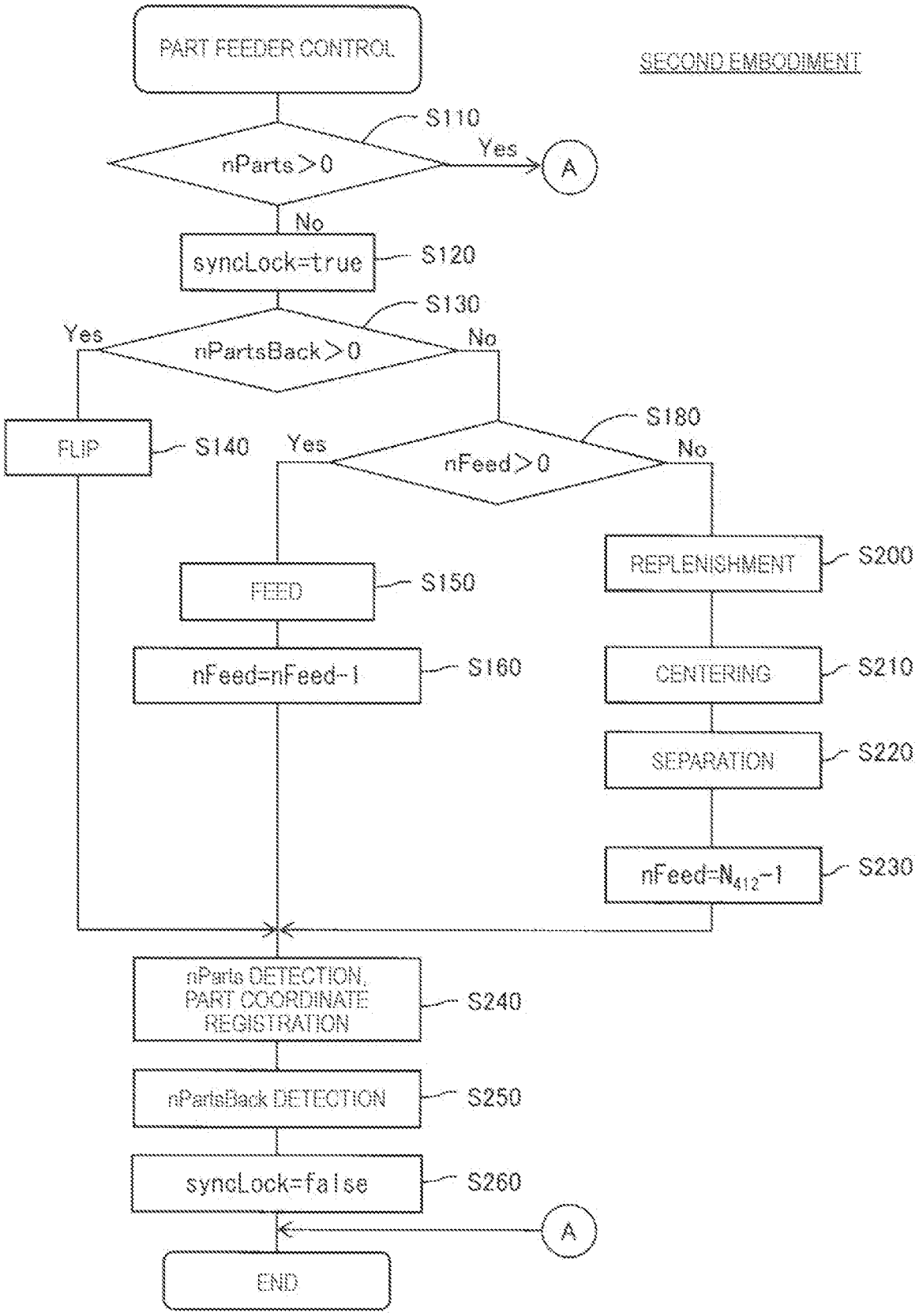
FIG. 9 is a flowchart of part feeder control in a second embodiment.

FIG. 9 is a flowchart of part feeder control in a second embodiment. Difference from the flowchart of the first embodiment illustrated in FIG. 6 is that only steps S170 and S190 are removed, and other steps are the same as the steps in FIG. 6.

In the second embodiment, when a first part replenishment is performed in step S200, new parts are not replenished until all the replenished parts are picked up. The replenishment is executed again in step S200 after all the parts in the part accommodating region 412 are picked up. According to the second embodiment, substantially the same effect as the first embodiment can be obtained.

C. Third Embodiment

Figure 10:
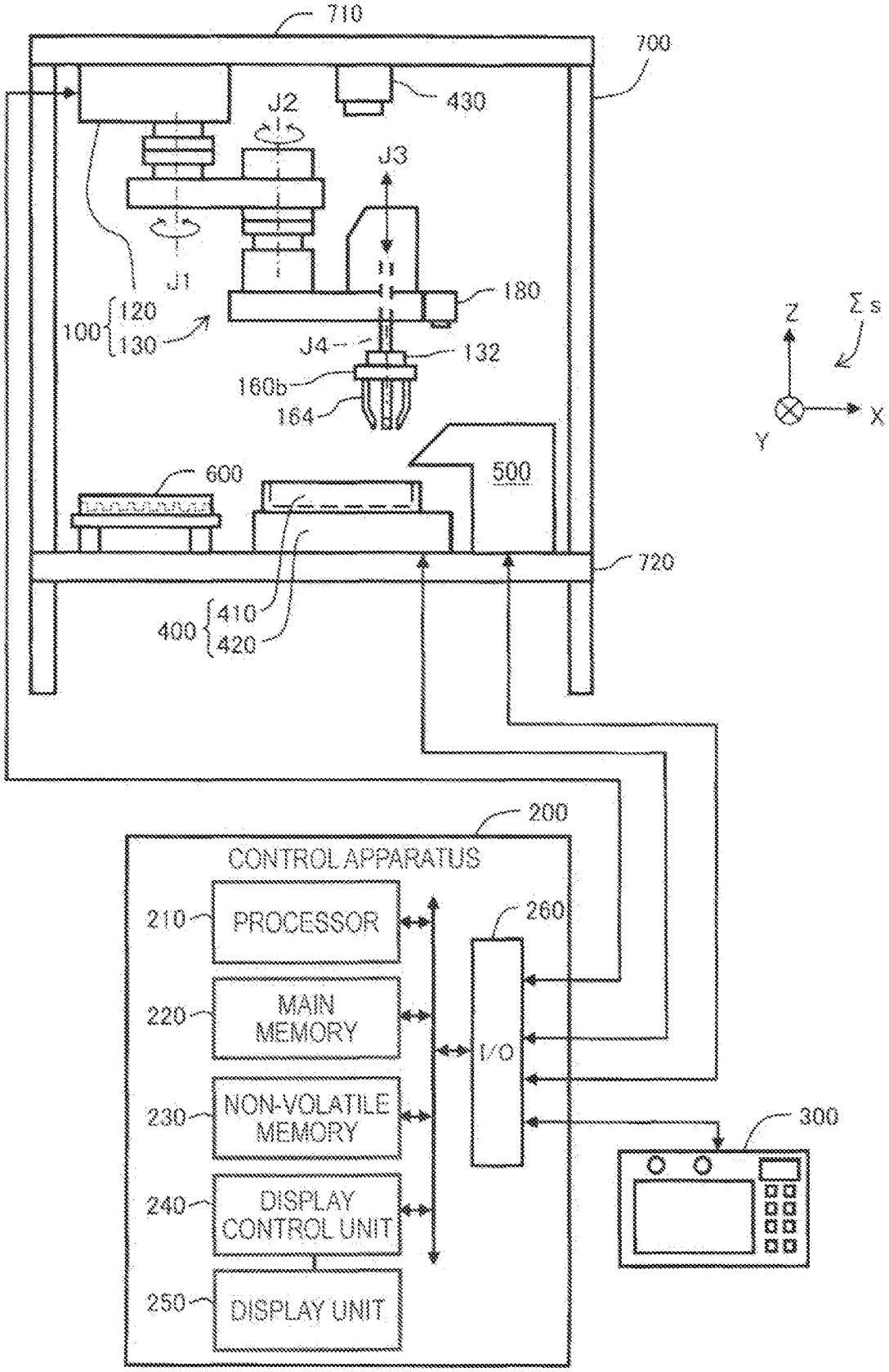
FIG. 10 is a conceptual diagram of a robot system in a third embodiment.

FIG. 10 is a conceptual diagram of a robot system in a third embodiment. The robot system is the same as the robot system of the first embodiment (FIG. 1) except for the end effector 160b. The end effector 160b is a gripper that grips and picks up a part using a gripping mechanism 164.

Figure 11:
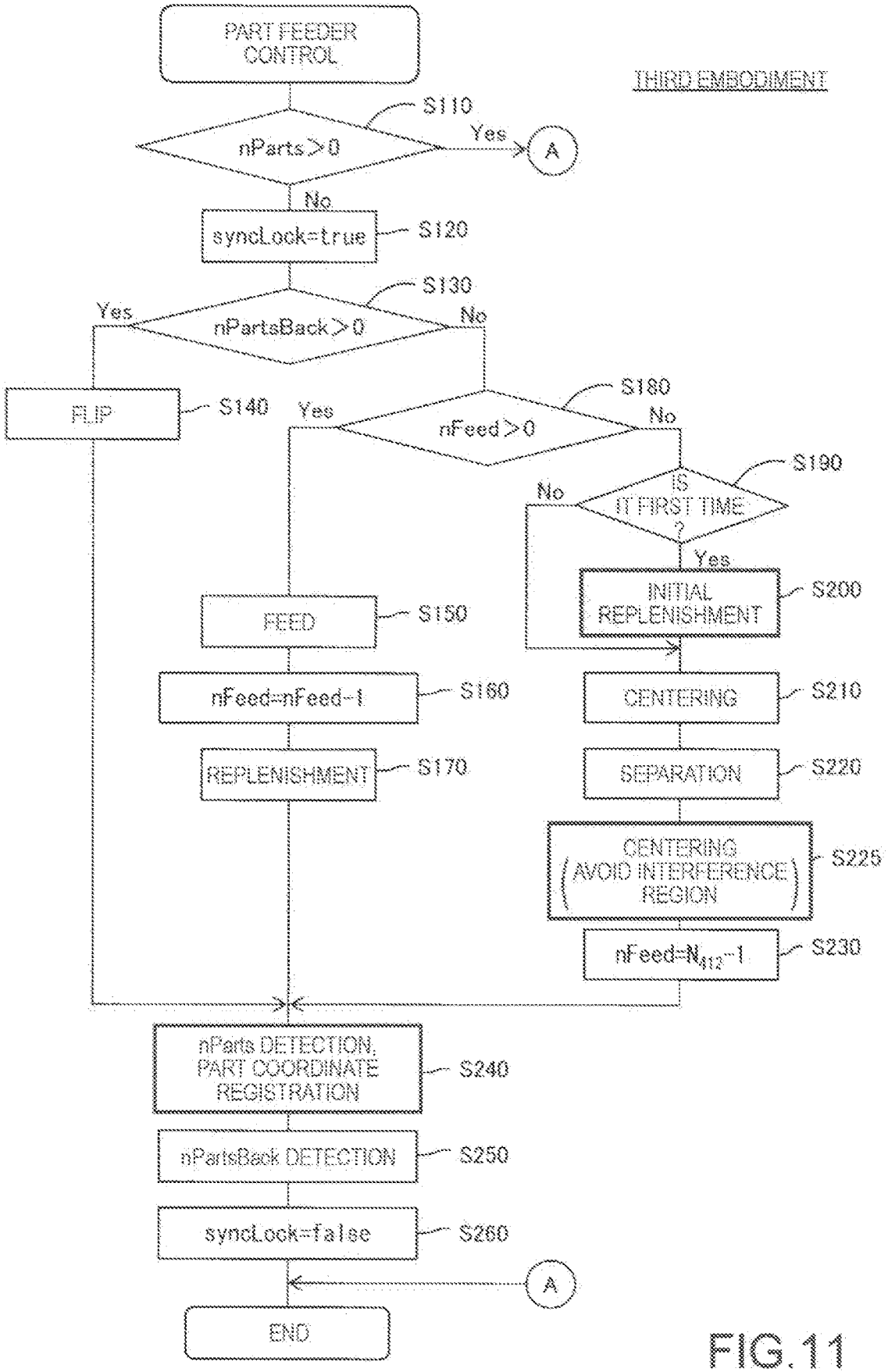
FIG. 11 is a flowchart of part feeder control in the third embodiment.

FIG. 11 is a flowchart of part feeder control in the third embodiment. Difference from the flowchart of the first embodiment illustrated in FIG. 6 is that only step S225 is added between steps S220 and S230, and other steps are the same as the steps in FIG. 6. In a state where the separation operation in step S220 is ended, the parts PP are almost uniformly dispersed in the part accommodating region 412.

Figure 12A:
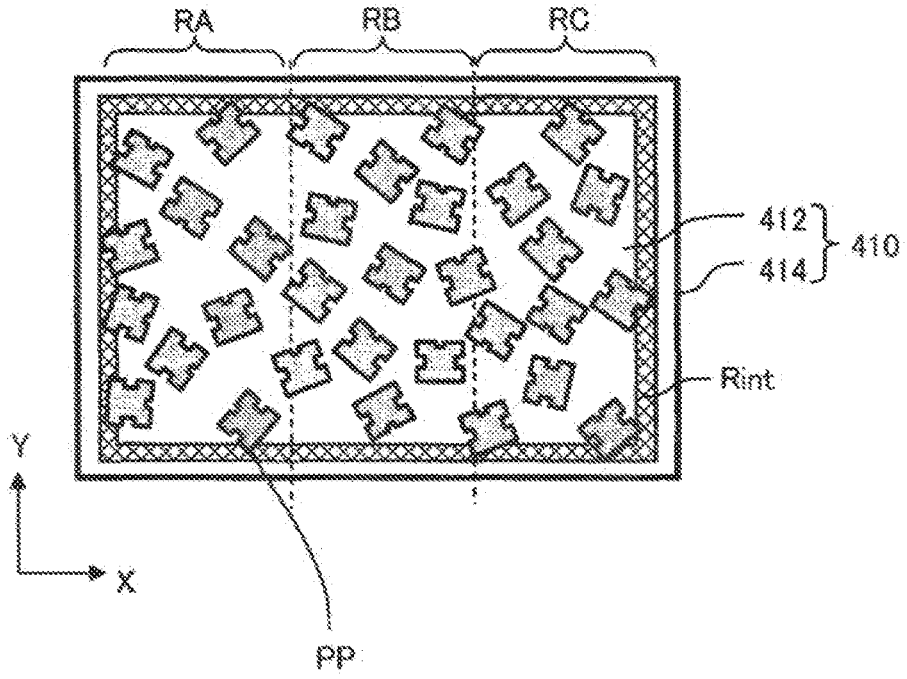
FIG. 12A is an explanatory diagram illustrating an interference region in the outer periphery of the part accommodating region.

FIG. 12A illustrates a state where the separation operation of step S220 is ended in the third embodiment. Three recessed portions around each part PP indicate places gripped by the gripping mechanism 164 of the end effector 160b. However, as the gripping mechanism 164, a mechanism that grips with two points may be used instead of the mechanism that grips with three points. The part accommodating unit 410 has the outer peripheral wall 414 provided on the outer periphery of the part accommodating region 412. An interference region Rint where the gripping mechanism 164 of the end effector 160b interferes with the outer peripheral wall 414 exists in the outer periphery portion of the part accommodating region 412. There is a possibility that a part PP partially or entirely overlapping with the interference region Rint cannot be gripped by physical interference between the gripping mechanism 164 and the outer peripheral wall 414. Therefore, in the case of performing the pick-up work of the part PP by the robot 100, it is preferable to set a state where there is no part PP partially or entirely overlapping with the interference region Rint.

Figure 12B:
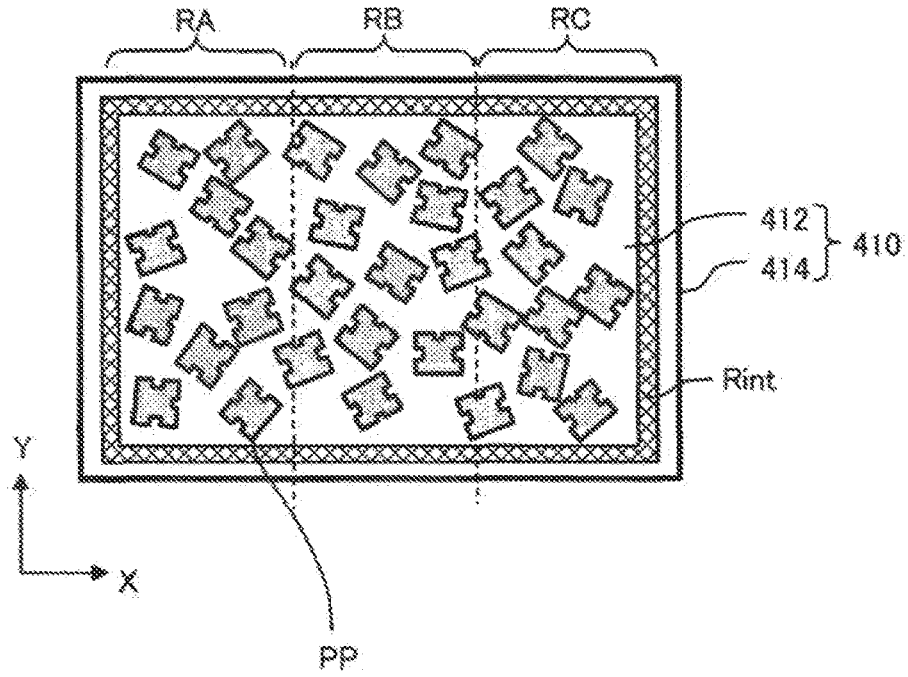
FIG. 12B is an explanatory diagram illustrating an operation of the centering command to avoid the interference region.

In step S225 of FIG. 11, the part feeder control unit 212 transmits the centering command to the part feeder 400 and executes the centering operation. FIG. 12B illustrates a result of the centering operation. As a result of the parts PP existing in the interference region Rint in FIG. 12A moving toward the inside of the part accommodating region 412, there is the state where there is no part PP partially or entirely overlapping with the interference region Rint. Since a vibration continuing time of the centering operation is set to a short value compared with the centering operation in step S210 described in FIG. 5B, a movement distance of the part PP is short. When such a centering operation is performed, since the interference between the gripping mechanism 164 of the end effector 160b and the outer peripheral wall 414 can be reduced, it is possible to improve the efficiency of the pick-up work of the part PP.

In the third embodiment, since the part PP is picked up using the gripping mechanism 164, it is preferable that additional regions for gripping are set at a plurality of places on the outer edge of the part PP and the detection of the part PP (process in step 240) is executed as the following description.

Figure 13A:
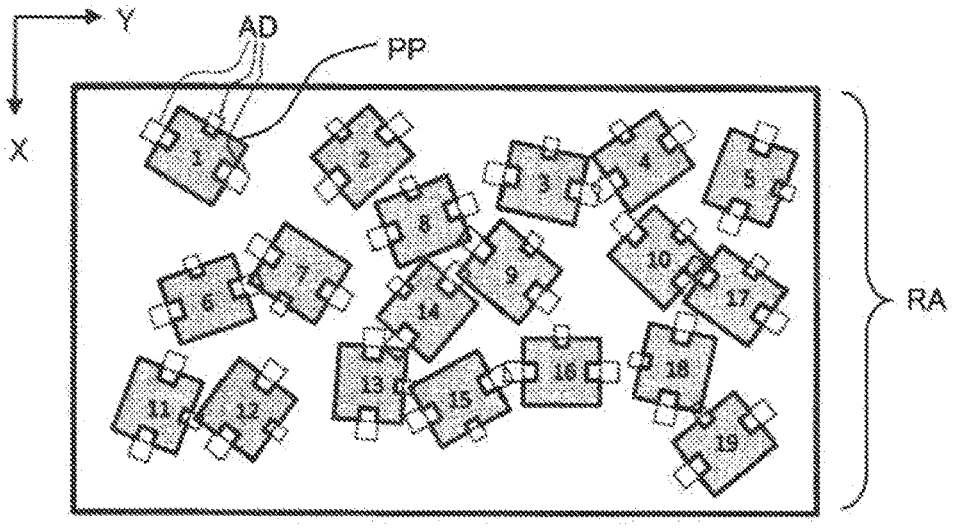
FIG. 13A is an explanatory diagram of an image recognition process of parts provided with additional regions for gripping.

FIG. 13A is an explanatory diagram of an image recognition process of parts PP provided with additional regions AD for gripping. Here, for convenience of illustration, only the picking partition RA is drawn in a state of being rotated clockwise by 90 degrees from the direction of FIG. 12B, and it is assumed that all the parts PP are forward-facing. The illustration of the interference region Rint is omitted. In three gripping positions on the outer edge of each part PP, regions necessary for the gripping mechanism 164 to grip are indicated by dotted lines as the additional regions AD.

In step S240 of FIG. 11, the image recognition unit 214 executes a setting process of respectively setting the additional regions AD to each part PP in an image acquired by the camera 430. The image recognition unit 214 assigns a part number to each part PP. In FIG. 13A, a number drawn at the center of each part PP indicates the part number. The image recognition unit 214 further executes the recognition process of recognizing a part PP in which the additional regions AD thereof do not overlap with another part PP as a grippable part among the parts PP existing in the picking partition RA. At this time, "another part PP" means the outline of the part PP without the additional regions AD. In the example of FIG. 13A, the grippable parts are eleven parts PP with part numbers of 1 to 5, 7, 8, 12, 15, 16, and 18. The image recognition unit 214 registers the parts PP recognized as the grippable parts in the part coordinate list 234.

FIG. 14A illustrates an example of the part coordinate list 234. Here, the eleven parts PP recognized as the grippable parts by the image recognition process with respect to FIG. 13A are registered. The registration contents are a part number n and a coordinate value (Xn,Yn) thereof. The robot control unit 211 controls the robot 100 so as to grip and pick up the grippable parts registered in the part coordinate list 234 with the gripping mechanism 164 of the end effector 160b. In this manner, since the grippable parts are recognized in consideration of the additional regions AD necessary for the gripping, it is possible to prevent a part PP that cannot be gripped by the gripping mechanism 164 from being recognized as the part to be gripped and improve the efficiency of the pick-up work of the part PP. The recognition of the grippable parts in consideration of such additional regions AD may be performed with respect to only parts PP in the picking partition RA or to the entire part accommodating region 412. However, when the recognition of the grippable parts in consideration of the additional regions AD is performed with respect to only parts PP in the picking partition RA, it is possible to reduce a process time.

Figure 13B:
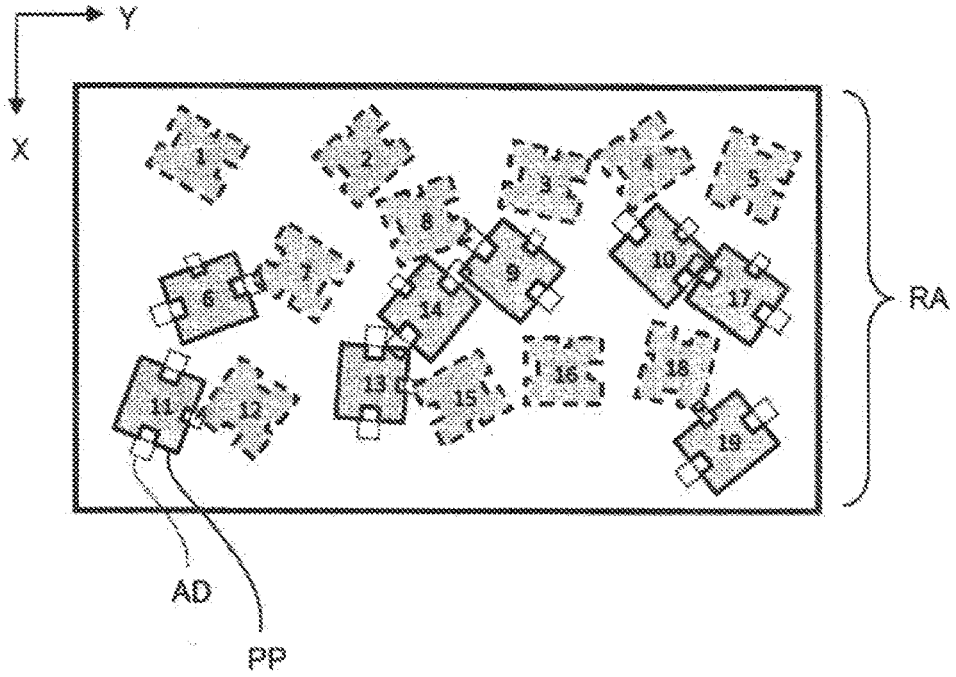
FIG. 13B is an explanatory diagram of an image updated such that grippable parts are deleted.

The image recognition unit 214 may delete the grippable parts from the image after the recognition process in FIG. 13A to execute the image update process of updating the image. FIG. 13B illustrates an updated image in this manner. In this image, the eleven parts PP recognized as the grippable parts in FIG. 13A are deleted, and the outlines of the deleted parts are drawn by broken lines for convenience of illustration. The image recognition unit 214 executes again the recognition process described in FIG. 13A using the updated image. Grippable parts recognized in FIG. 13B are five parts PP with part numbers of 6, 9, 11, 13, and 19. The image recognition unit 214 additionally registers the parts PP recognized as the grippable parts again in the part coordinate list 234.

FIG. 14B illustrates a state where the five parts PP recognized as the grippable parts by the image recognition process with respect to FIG. 13B are additionally registered. The image recognition unit 214 deletes the grippable parts from the image after the recognition process in FIG. 13B to execute the image update process of updating the image.

Figure 13C:
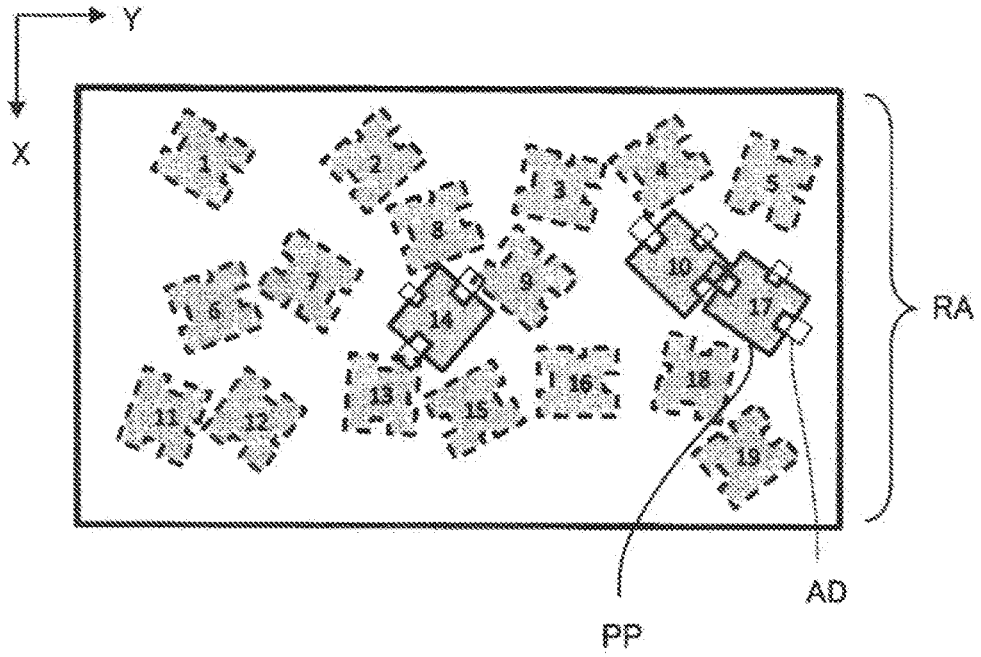
FIG. 13C is an explanatory diagram of a further updated image.
Figure 13D:
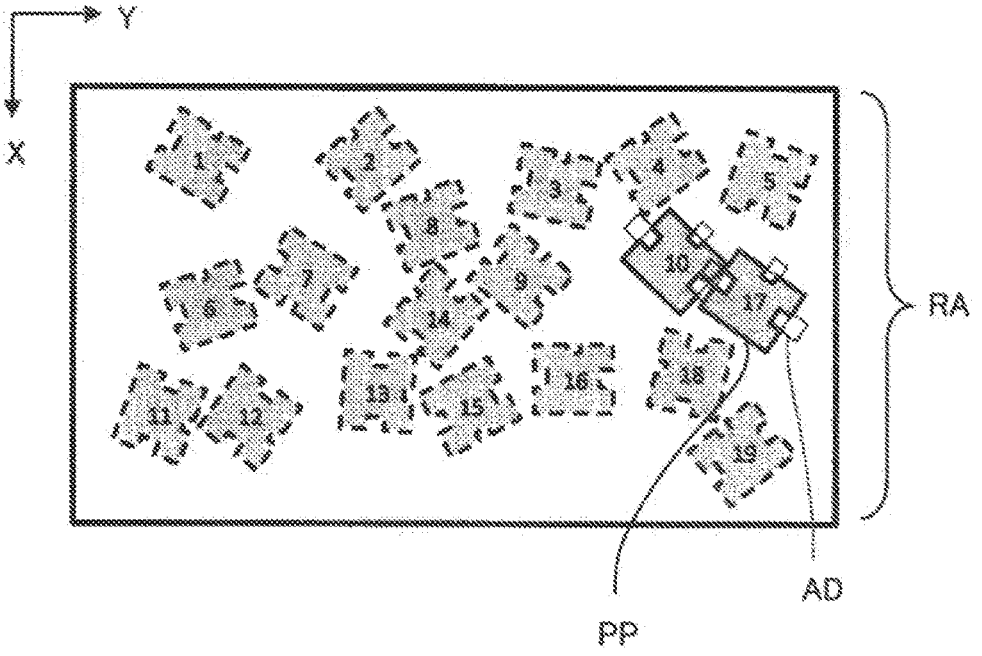
FIG. 13D is an explanatory diagram of a further updated image.

FIG. 13C illustrates an updated image. In this image, the five parts PP recognized as the grippable parts in FIG. 13B are deleted. Similarly to the above, the recognition process and the image update process are executed also with respect to the updated image. Grippable part recognized in FIG. 13C is one part PP with part number of 14. The image recognition unit 214 additionally registers the part PP recognized as the grippable part in the part coordinate list 234. FIG. 14C illustrates a state where the one part PP recognized as the grippable part by the image recognition process with respect to FIG. 13C is additionally registered. The image recognition unit 214 deletes the grippable part from the image after the recognition process in FIG. 13C to execute the image update process of updating the image. FIG. 13D illustrates an updated image in this manner.

As described with reference to FIGS. 13B to 13D, it is preferable that the image recognition unit 214 repeats the recognition process and the image update process and registers the order in which each part is recognized as the grippable part in the part coordinate list 234. Then, the robot control unit 211 can execute the control of the robot 100 so as to grip and pick up the part PP in the picking partition RA according to the order registered in the part coordinate list 234. In this manner, since more parts PP can be recognized as the grippable parts, it is possible to improve the efficiency of the pick-up work of the part PP. However, the recognition process and the image update process described in FIGS. 13B to 13D may not be repeated, and the recognition process may be executed only once in FIG. 13A.

In the third embodiment, another type of posture change operation may be performed instead of the flip operation in step S140 of FIG. 11. For example, the rotation operation of rotating the part PP on the surface of the part accommodating region 412 may be performed as the posture change operation. In this manner, it is possible to change the posture of the part PP in a grippable manner by rotating the part PP that cannot be gripped by the gripping mechanism 164. The rotation operation is also the same as the flip operation used in the first embodiment in a sense that the posture of the part PP that cannot be picked up is changed to the part PP that can be picked up. As described above, in the case where it is recognized by the image recognition that there exist only the parts PP that cannot be picked up in the picking partition RA, it is commonly possible to consider that step S140 is a step of executing the posture change operation for changing the posture of the parts PP.

D. Fourth Embodiment

Figure 15:
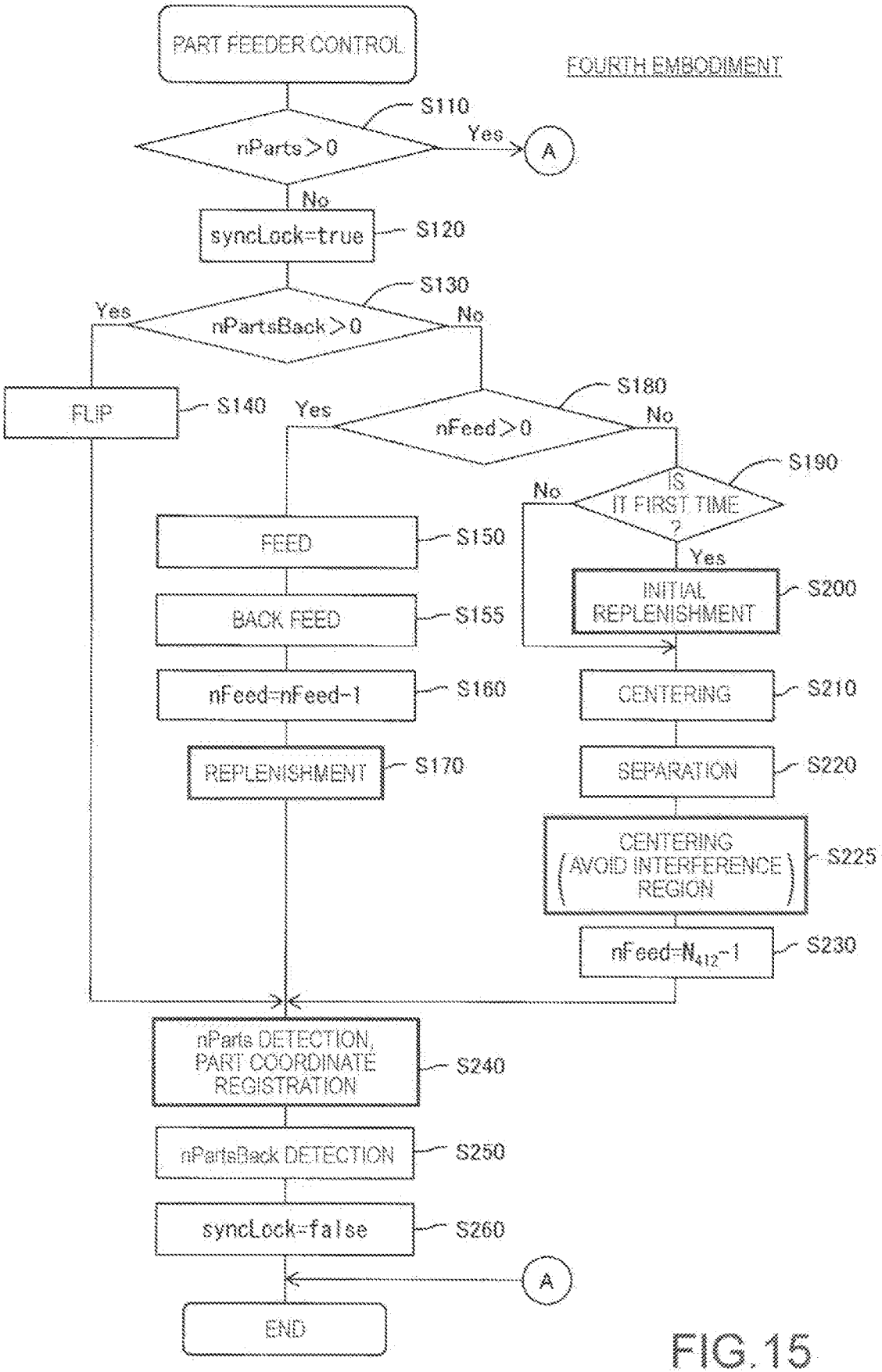
FIG. 15 is a flowchart of part feeder control in a fourth embodiment.

FIG. 15 is a flowchart of part feeder control in a fourth embodiment. Difference from the flowchart of the third embodiment illustrated in FIG. 11 is that step S155 is added after step S150, and other steps are the same as the steps in FIG. 11. In step S155, a back feed operation is executed. The back feed operation is an operation of moving the part in a direction opposite to the feed operation executed in step S150. It is preferable that a time of the back feed operation is shorter than a time of the feed operation in step S150.

Figure 16:
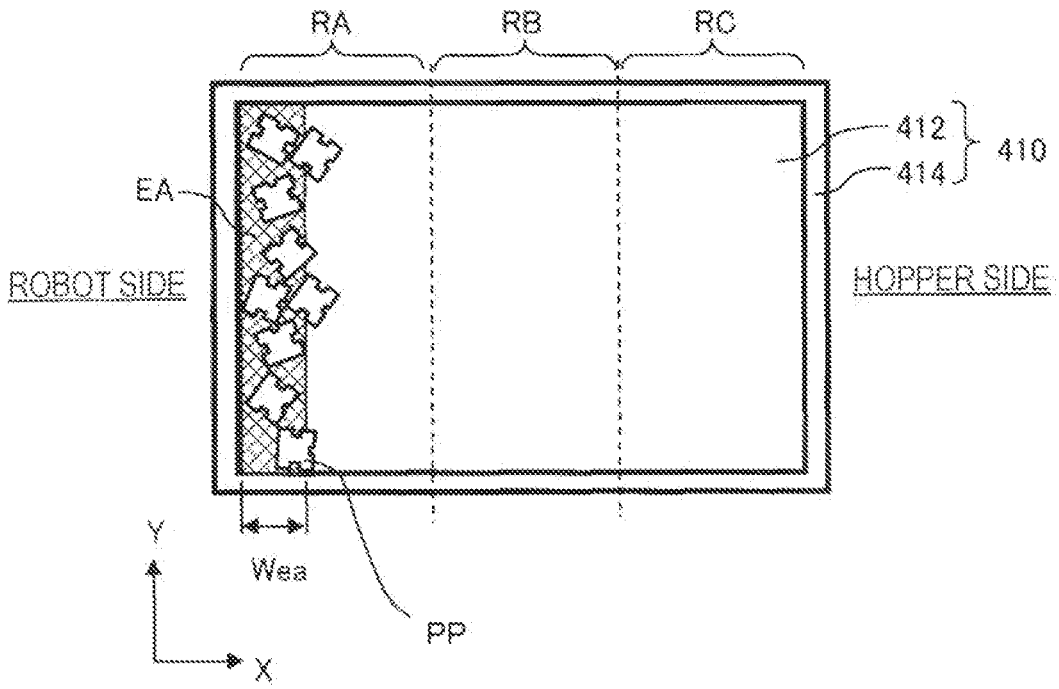
FIG. 16 is an explanatory diagram illustrating a state suitable for a back feed operation.

FIG. 16 is an explanatory diagram illustrating a state suitable for the back feed operation. In this example, parts PP are unevenly distributed in an end portion region EA on a robot side (indicated by hatching) due to the feed operation in step S150. In such a state, since a ratio of parts PP not suitable for the pick-up work by the robot is large, it is possible to set a state suitable for the pick-up work by back-feeding the parts PP to a hopper side.

It may be determined that the necessity of the back feed operation and the back feed time in step S155 using the result of the image recognition process. It is possible to perform the determination, for example, using an uneven distribution ratio Ru of the parts calculated according to the following equation.

$$Ru=Sp/Se \quad (1)$$

Here, Sp is a sum of areas of parts PP in the end portion region EA, and Se is an area of the end portion region EA. For example, in a case where a part PP is recognized as a black image, it is possible to calculate the parts area Sp as the number of black pixels in the end portion region EA.

A width Wea of the end portion region EA is set to be smaller than a width of the picking partition RA. For example, it is preferable to set the width Wea of the end portion region EA to a value in a range of one to two times the width of the part PP. In the example of FIG. 16, the end portion region EA is set on the left side of the part accommodating region 412, but a position of the end portion region EA is set according to a movement direction of the part PP in the feed operation. That is, it is preferable that the end portion region EA is set near a side which is the terminal end in a direction of the feed operation among four sides of the part accommodating region 412.

In a case where the uneven distribution ratio Ru of the parts is equal to or greater than a predetermined threshold, since the parts PP are unevenly distributed as illustrated in FIG. 16, it is preferable to perform the back feed operation in step S155. The time of the back feed operation may be determined according to the uneven distribution ratio Ru. Specifically, it is preferable to lengthen the back feed time as the uneven distribution ratio Ru increases.

Various pieces of control may be executed using the image recognition result other than the uneven distribution ratio Ru of the parts.

FIG. 17 illustrates an example of various platform states obtained by the image recognition. The "platform" means the part accommodating region 412. Here, the following seven states are exemplified.

State 1: Pickable State

A state where parts are dispersed in a pickable state in the platform.

State 2: Empty State

A state where there is no part in the platform.

State 3: Unevenly Distributed Pick Position State

A state where parts are unevenly distributed at the end portion of the platform. The state 3 corresponds to the state described in FIG. 16.

State 4: Excessively Large Number of Remaining Parts State

A state where the remaining number of parts is 20% or more than an appropriate number.

State 5: Excessively Small Number of Remaining Parts State

A state where the remaining number of parts is 20% or less than the appropriate number.

State 6: Excessively Large Number of Remaining Backward-Facing Parts State

A state where the remaining number of backward-facing parts is 10% or more than the appropriate number.

State 7: No Pickable Parts State

A state where there are no parts required to be picked up although the parts exist in the platform and only another type of part exists.

The states can be used for executing various pieces of control and adjusting the control contents. For example, in a case where state 2 or state 7 is recognized at a predetermined point in time, the process may jump to step S200 of FIG. 15 to replenish the parts. In a case where state 4 or state 5 is recognized, the number of replenishments in step S170 may be changed according to the remaining number of parts. In this manner, when the control contents are adjusted according to various image recognition results, it is possible to further improve the work efficiency. The adjustment of the control contents according to such image recognition results can be employed in other embodiments. The point that the back feed operation of step S155 is performed after the feed operation of step S150 can also be employed in other embodiments.

E. Fifth Embodiment

Figure 18:
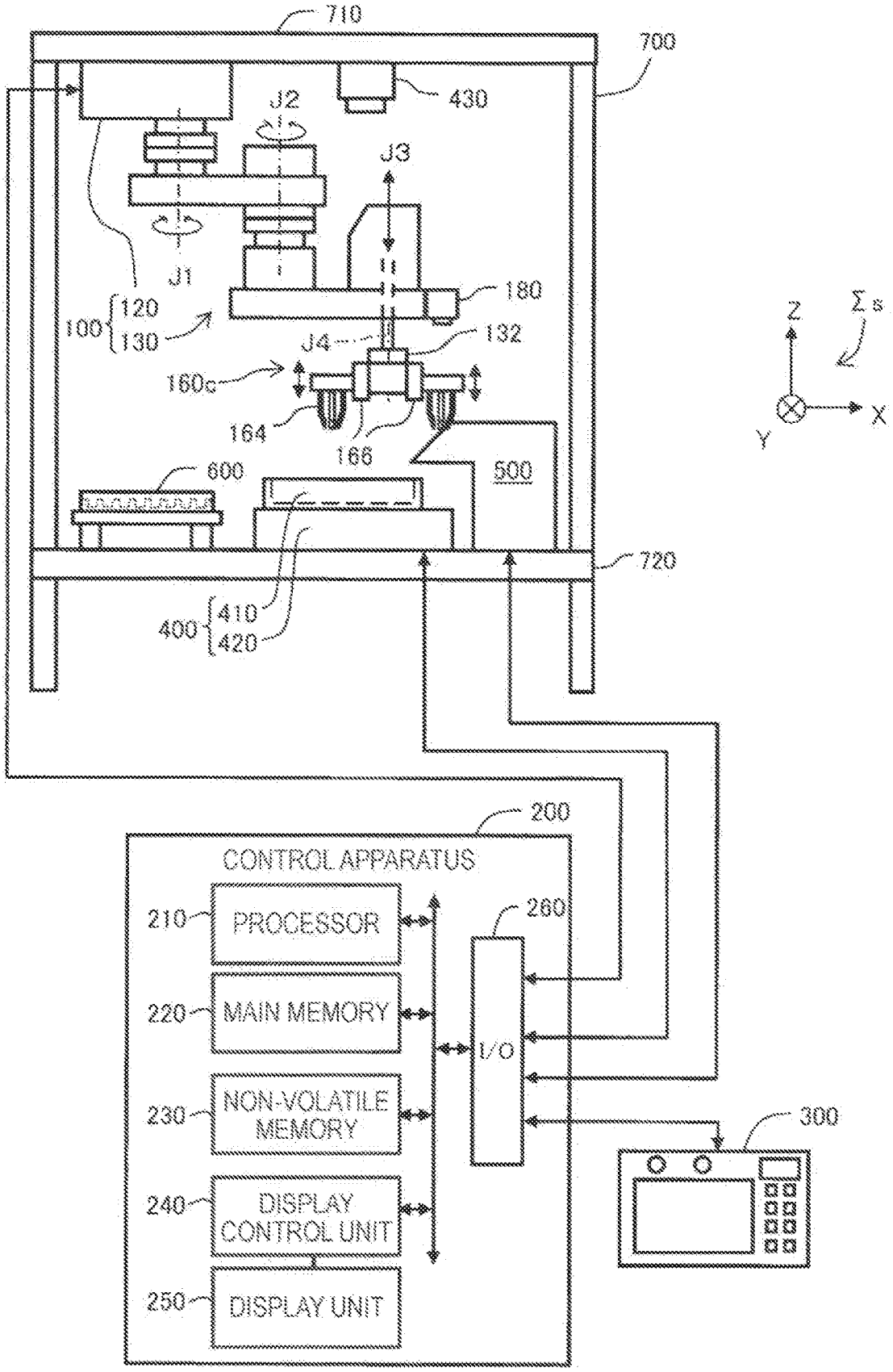
FIG. 18 is a conceptual diagram of a robot system in a fifth embodiment.

FIG. 18 is a conceptual diagram of a robot system in a fifth embodiment. The robot system is the same as the robot system of the first embodiment (FIG. 1) and the third embodiment (FIG. 10) except for the end effector 160c. The end effector 160c is a gripper having double hands that can grip and pick up two parts using two gripping mechanisms 164.

Figure 19:
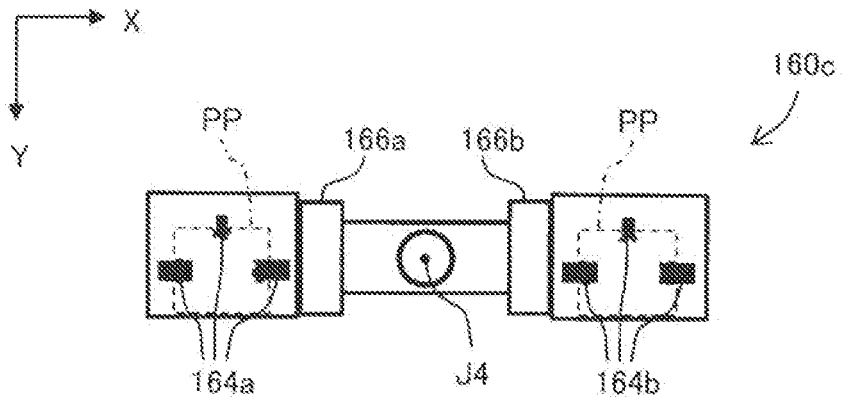
FIG. 19 is an explanatory diagram of an end effector of the fifth embodiment.

FIG. 19 is a plan view of the end effector 160c. The end effector 160c has two gripping mechanisms 164a and 164b, and two vertical movement mechanisms 166a and 166b. The gripping mechanisms 164a and 164b are grippers that grip the parts PP at three points in this example. The vertical movement mechanisms 166a and 166b can change heights of the two gripping mechanisms 164a and 164b by respectively moving the gripping mechanisms 164a and 164b in the vertical direction (Z direction). A relative height of the two gripping mechanisms 164a and 164b may be changed using one vertical movement mechanism, by omitting one of the two vertical movement mechanisms 166a and 166b.

Figure 20A:
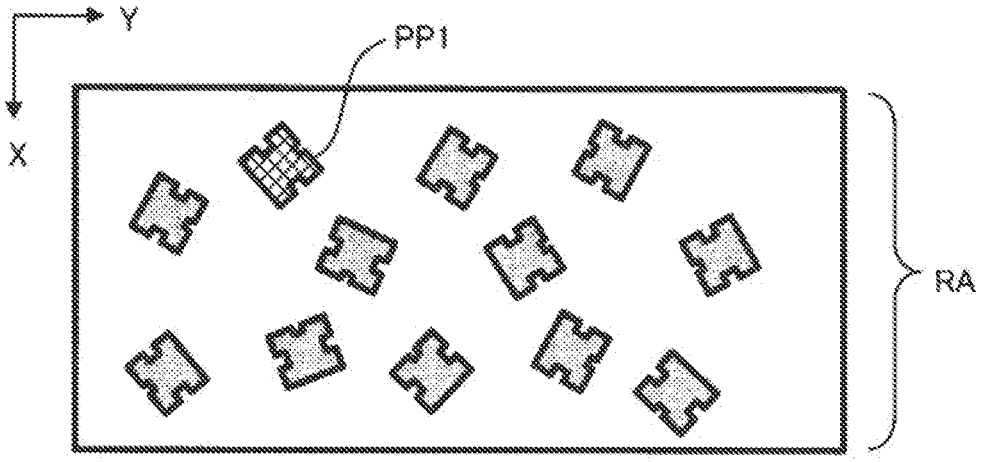
FIG. 20A is an explanatory diagram of a recognition process of a part that can be gripped by two gripping mechanisms.
Figure 20B:
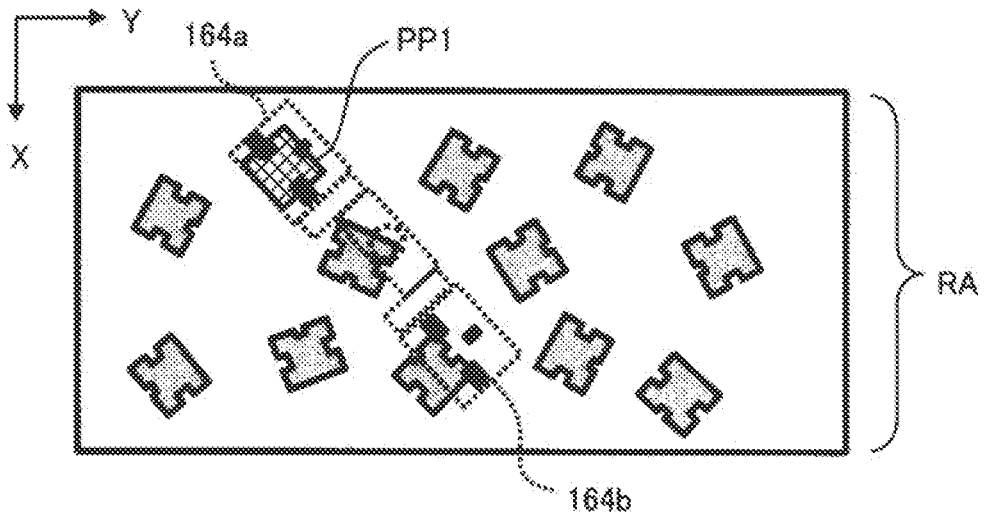
FIG. 20B is an explanatory diagram of the recognition process of a part that can be gripped by the two gripping mechanisms.
Figure 20C:
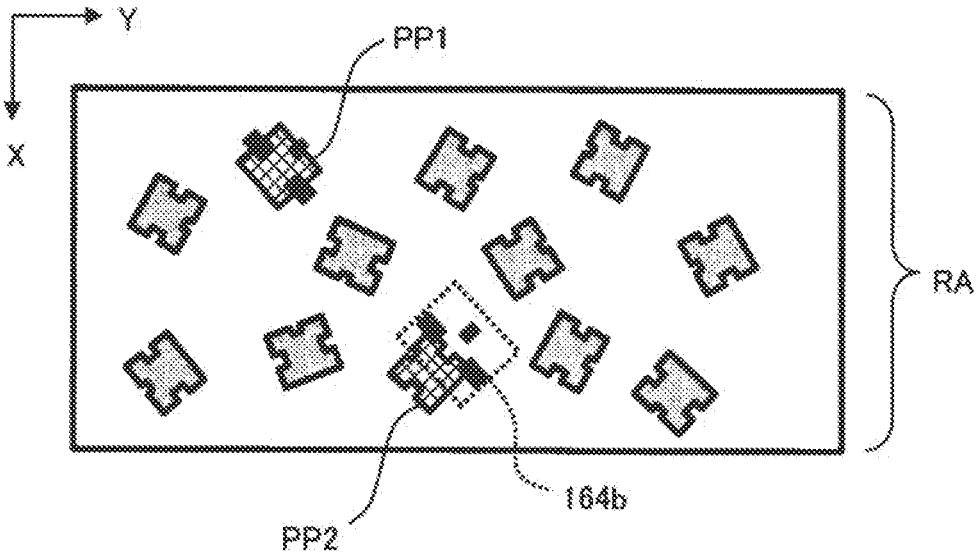
FIG. 20C is an explanatory diagram of the recognition process of a part that can be gripped by the two gripping mechanisms.

FIGS. 20A to 20D are explanatory diagrams illustrating a recognition process of parts PP that can be gripped by the two gripping mechanisms 164a and 164b. The image recognition unit 214 first recognizes a part PP1 that can be gripped by a first gripping mechanism 164a (FIG. 20A). The part PP1 is referred to as "first grippable part PP1". Next, the image recognition unit 214 recognizes a position of a second gripping mechanism 164b in a state of gripping the first grippable part PP1 with the first gripping mechanism 164a (FIG. 20B). At this time, the image recognition unit 214 calculates a coordinate and a gripping angle (angle around Z-axis) of the second gripping mechanism 164b using a positional relationship in the horizontal direction of the two gripping mechanisms 164a and 164b. Then, the image recognition unit 214 recognizes a part PP2 that can be gripped by the second gripping mechanism 164b (FIG. 20C). The part PP2 is referred to as "second grippable part PP2". In this manner, when the process of recognizing the second grippable part PP2 that can be gripped by the second gripping mechanism 164b is executed in the state of gripping the first grippable part PP1 with the first gripping mechanism 164a, it is possible to improve the efficiency of the work of picking up the parts PP using the two gripping mechanisms 164a and 164b.

As the second grippable part PP2, it is preferable to select a part PP that is most easily gripped by the second gripping mechanism 164b in the state of gripping the first grippable part PP1 with the first gripping mechanism 164a. The selection can be performed, for example, according to a pick-up cost. The "pick-up cost" is calculated according to a predetermined calculation method with respect to one or more parts PP that can be gripped by the second gripping mechanism 164b in the state of gripping the first grippable part PP1 with the first gripping mechanism 164a.

The following various types of method can be considered as the calculation method of the pick-up cost.

(1) Pick-Up Cost Calculation Method 1

A trajectory of the robot 100 required for gripping one or more parts PP near the second gripping mechanism 164b by the second gripping mechanism 164b is calculated from the state (FIG. 20A) of gripping the first grippable part PP1 with the first gripping mechanism 164a, and a time for moving the trajectory is taken as the pick-up cost.

(2) Pick-Up Cost Calculation Method 2

A distance between the second gripping mechanism 164b and each part PP is calculated for one or more parts PP near the second gripping mechanism 164b from the state (FIG. 20A) of gripping the first grippable part PP1 with the first gripping mechanism 164a, and the distance is taken as the pick-up cost.

(3) Pick-Up Cost Calculation Method 3

A rotation angle (rotation angle of torsional joint J4) of the end effector 160c required for gripping one or more parts PP near the second gripping mechanism 164b by the second gripping mechanism 164b is calculated from the state (FIG. 20A) of gripping the first grippable part PP1 with the first gripping mechanism 164a, and the rotation angle is taken as the pick-up cost.

Figure 20D:
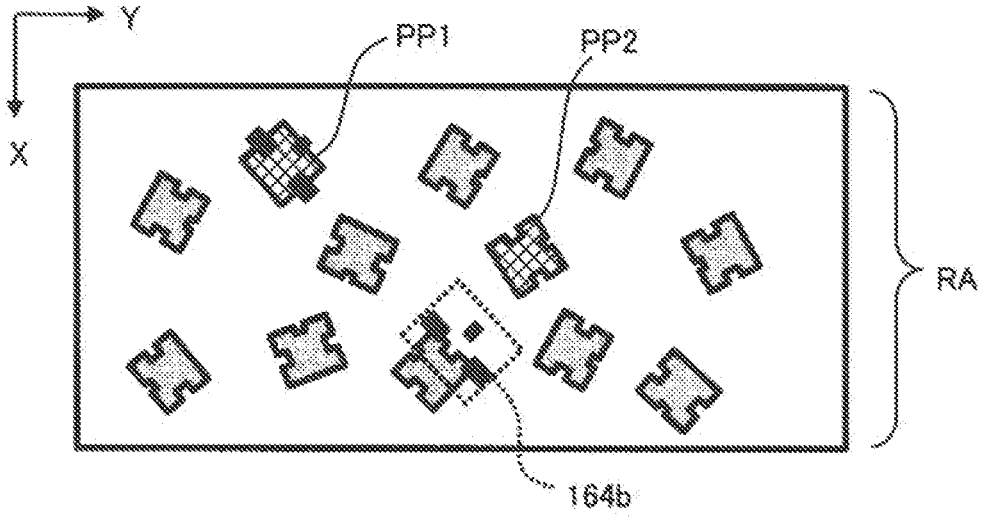
FIG. 20D is an explanatory diagram of recognition process of a part that can be gripped by the two gripping mechanisms.

The second grippable part PP2 illustrated in FIG. 20C is a part in which the pick-up cost calculated by the calculation method 2 is minimized. The second grippable part PP2 illustrated in FIG. 20D is a part in which the pick-up cost calculated by the calculation method 3 is minimized. In a case where a position for gripping the part PP is determined in advance according to a shape of the part PP as the part PP in the embodiment, the calculation method 1 (trajectory reference) or the calculation method 3 (rotation angle reference) is suitable. On the other hand, in a case where a position for picking up the part PP by the end effector 160 does not depend on the shape of the part PP (for example, case of using adsorption pick-up mechanism) as the part PP in the first embodiment, the calculation method 1 (trajectory reference) or the calculation method 2 (distance reference) is suitable.

As described above, when the pick-up cost is respectively calculated according to the predetermined calculation method with respect to one or more parts PP that can be gripped by the second gripping mechanism 164b in the state of gripping the first grippable part PP1 with the first gripping mechanism 164a, and the second grippable part PP2 is selected according to the pick-up costs, it is possible to improve the efficiency of gripping the part with the second gripping mechanism 164b.

The selection of two grippable parts as described above can also be employed in a robot including an end effector having two pick-up mechanisms (for example, adsorption pick-up mechanisms) other than the gripping mechanism 164. In this case, the image recognition unit 214 executes a process of recognizing a second pickable part PP2 that can be picked up by a second pick-up mechanism in a state of holding a first pickable part PP1 with a first pick-up mechanism. In this manner, it is possible to improve the efficiency of picking up the part with the second pick-up mechanism.

F. Initial Setting of Control Parameters of Part Feeder

Figure 21:
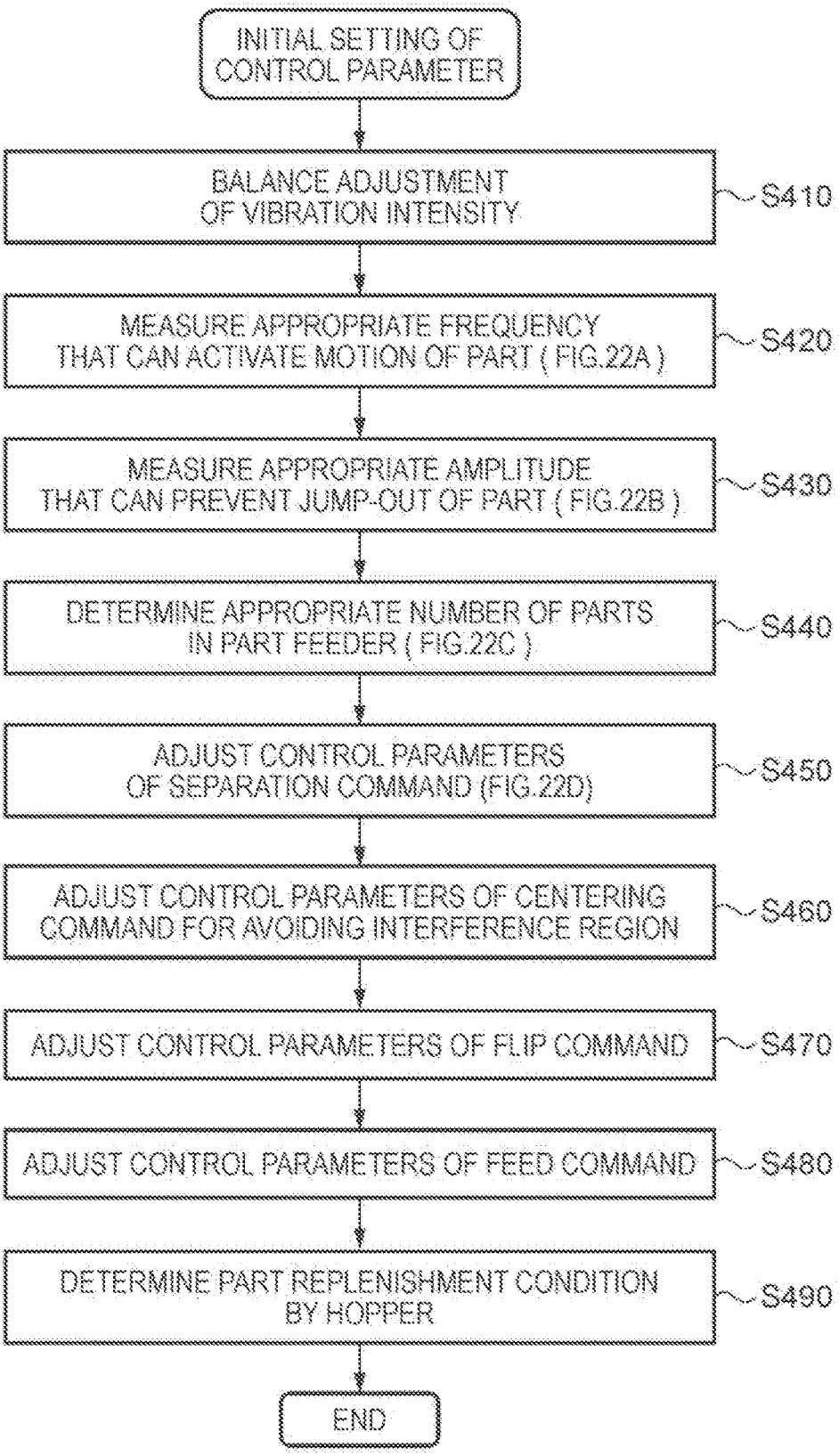
FIG. 21 is a flowchart of an initial setting of control parameters of a part feeder.

FIG. 21 is a flowchart of an initial setting of control parameters of the part feeder 400, and FIGS. 22A to 22E are explanatory diagrams illustrating process contents of steps S420 to S450 of FIG. 21. The process is executed before performing the pick-up work of the part PP by the robot 100 described above. The process is executed by acquiring an image of parts PP in the part accommodating region 430 by the camera 430 and analyzing the image by the control parameter setting unit 215.

In step S410, a balance adjustment of vibration intensity of the plurality of vibration actuators 424 is performed. The adjustment is performed for compensating a tilt of the part accommodating region 412 and differences in characteristics of each vibration actuator 424. Specifically, for example, the plurality of parts PP are accommodated in the part accommodating region 412, the plurality of vibration actuators 424 are vibrated in the same phase, and a coordinate (XY coordinate) of each part PP is acquired. Then, amplitude of a vibration signal supplied to each vibration actuator 424 is adjusted such that coordinates of the plurality of parts PP are not unevenly distributed and an average value of the coordinates positions at the center of the part accommodating region 412. The balance of the vibration intensity adjusted as described above is used also after step S420.

In step S420, a frequency that can activate the motion of the parts PP is measured. In the measurement process, for example, one part PP is accommodated in the part accommodating region 412, the vibration actuators 424 with the predetermined number are vibrated, and a movement amount of the part PP is acquired. Then, a frequency of the vibration signal that maximizes the movement amount of the part PP is adjusted.

Figure 22A:
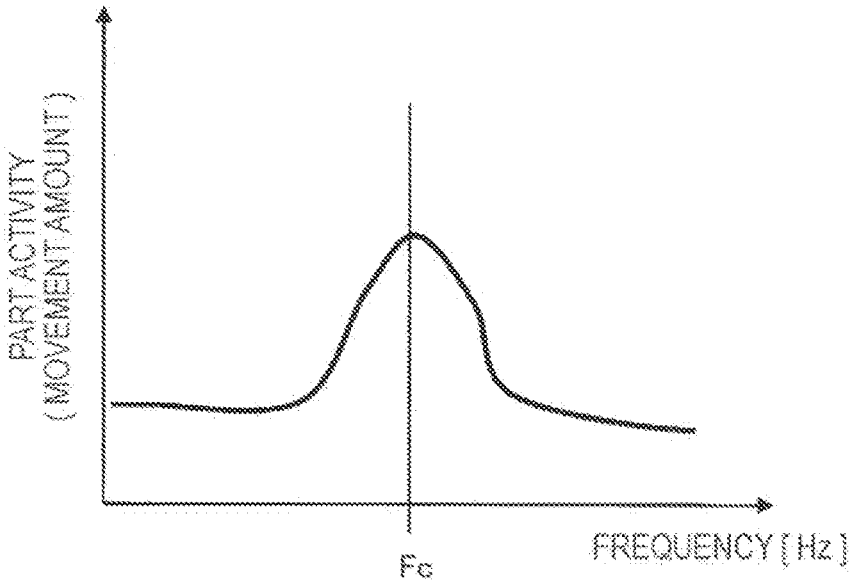
FIG. 22A is an explanatory diagram of a vibration frequency that activates the motion of parts.

FIG. 22A illustrates an example of a relationship between the frequency and the part activity (movement amount of parts PP) in step S420. In this example, a frequency Fc at the peak of the graph is measured as the frequency that can activate the motion of the parts. The frequency Fc is, for example, a value equal to the resonance frequency of the part accommodating region 412. The appropriate frequency determined as described above is used also after step S430.

As the number of vibration actuators 424 used in step S420, a predetermined number of one or more can be used. The frequency that can activate the motion of the parts may be measured for each combination of the used number of the vibration actuator 424 and a used place thereof. For example, in a case where the part feeder 400 includes four vibration actuators 424a to 424d and one, two, or four of the four vibration actuators are used, the number of combinations of the used number of the vibration actuator 424 and the used place thereof is eleven in maximum. In a case where two or four vibration actuators 424 are used, the frequency that can activate the motion of the parts may be measured for each of phase difference values (for example, 0 degrees and 180 degrees) of the vibration actuators. In this manner, the point that it is preferable to set the appropriate control parameter for each combination of the used number of the vibration actuator 424 and the used place thereof is the same as other control parameters described below.

In step S430, amplitude that can prevent jump-out of the parts PP is measured. The amplitude is amplitude as large as possible within a limit in which the parts PP do not jump out of the part accommodating region 412. In the measurement process, for example, the plurality of parts PP are accommodated in the part accommodating region 412, the plurality of vibration actuators 424 are vibrated, and it is determined from an image of the camera 430 whether the parts PP jump out of the part accommodating unit 410. The determination is performed while gradually increasing the amplitude of the vibration signal to obtain maximum amplitude at which the jump-out of the parts PP is not detected.

Figure 22B:
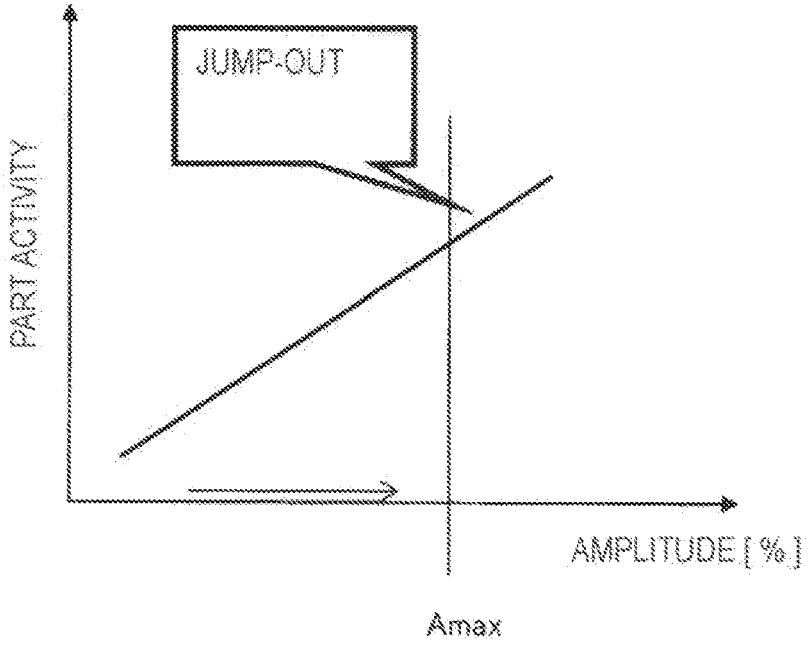
FIG. 22B is an explanatory diagram of vibration amplitude that does not cause parts to jump out of the part accommodating unit.

FIG. 22B illustrates an example of a relationship between the amplitude in step S430 and the part activity. In this example, maximum amplitude Amax at which the jump-out of the parts PP is not detected is measured as amplitude that can prevent jump-out of the parts PP. The appropriate amplitude determined as described above is used also after step S440.

In step S440, the appropriate number of parts PP in the part feeder 400 is determined. In this process, for example, a lot of parts PP are accommodated in the part accommodating region 412, the separation operation (FIG. 4B) is performed, and then an image acquired by the camera 430 is analyzed to obtain the number of the parts PP that can be picked up. It is preferable to determine whether the picking up is possible by ignoring the front and back of the part PP. In this case, for example, a part PP which is not overlapped with another part PP at all is determined as the part that can be picked up. This process is executed respectively under conditions that the number of parts PP accommodated in the part accommodating region 412 is subsequently changed, and the number of parts when the number of parts that can be picked up is the maximum is determined as the appropriate number of parts in the part feeder 400.

Figure 22C:
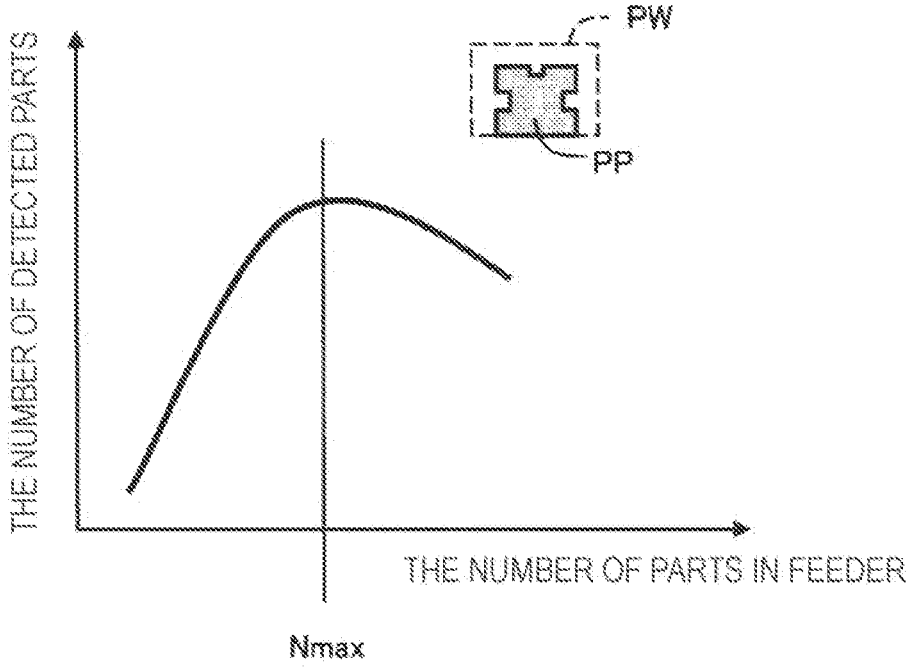
FIG. 22C is an explanatory diagram of the number of parts in the feeder that increases the number of detected parts.

FIG. 22C illustrates an example of a relationship between the number of parts in the part feeder 400 in step S440 and the number of parts detected as pickable. In this example, the number of parts in the part feeder 400 when the number of detected parts peaks is determined as the appropriate number of parts in the part feeder 400. The appropriate number of parts determined as described above is used also after step S450. In the case where the part PP is held using the gripping mechanism 164 as in the third to fifth embodiments, a window PW may be provided around the part PP in consideration of portions gripped by the gripping mechanism 164 as illustrated in FIG. 22C, and a part PP in which the window PW thereof does not overlap with the outline of another part PP may be recognized as "part PP that can be picked up". Alternatively, the additional regions AD (FIG. 13A) described in the third embodiment may be used instead of the window PW.

It is possible to determine the appropriate number of parts using simulation instead of actually performing an experiment to supply the parts to the part feeder 400.

Figure 22D:
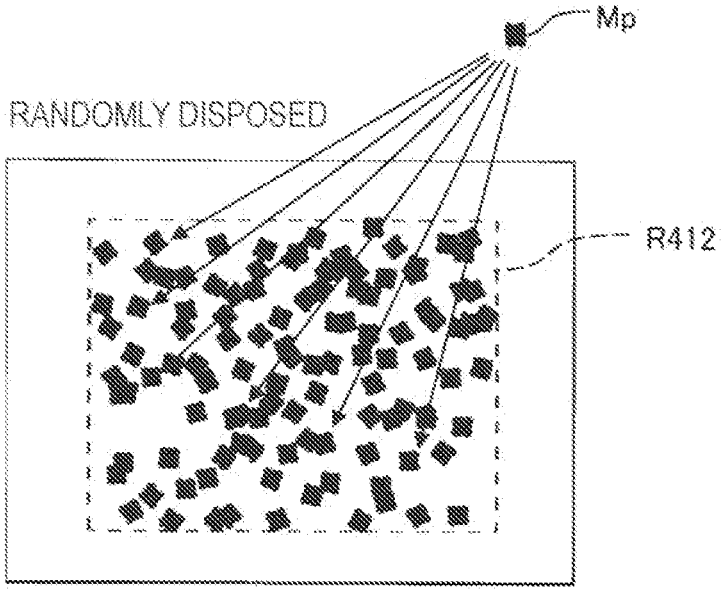
FIG. 22D is an explanatory diagram illustrating a process of determining the number of parts by simulation.

FIG. 22D is an explanatory diagram illustrating a process of determining the number of parts by simulation. At this time, one part is first imaged using the camera 430, and a part image Mp is cut out. Then, an image in which the cut out part image Mp is disposed randomly in a region R412 having the same shape as the part accommodating region 412 is created by simulation. Then, the number of parts that can be picked up is obtained by analyzing the simulation image. When this process is executed a plurality of times while changing the number of part images Mp in the region R412, it is possible to obtain the same characteristics as those in FIG. 22C by simulation. Then, it is possible to determine the number of parts in the part feeder 400 when the number of detected parts peaks as the appropriate number of parts in the part feeder 400. In this manner, when the appropriate number of parts is determined using simulation, it is possible to omit the labor of performing the experiment.

In step S450, control parameters of the separation command are adjusted. In the adjustment process, for example, the plurality of parts PP are accommodated in the part accommodating region 412, the separation operation (FIG. 4B) by the separation command is performed, and then an image acquired by the camera 430 is analyzed to obtain the number of the parts PP that can be picked up. It is preferable to determine whether the picking up is possible by ignoring the front and back of the part PP. It is preferable that the number of parts PP accommodated in the part accommodating region 412 is, for example, the appropriate number of parts determined in step S440. This process is executed respectively under conditions that the continuing time of the separation operation is subsequently changed, and a value in which the number of parts that can be picked up is sufficiently large and the continuing time of the separation operation is not excessively long is determined as the continuing time of the separation operation.

Figure 22E:
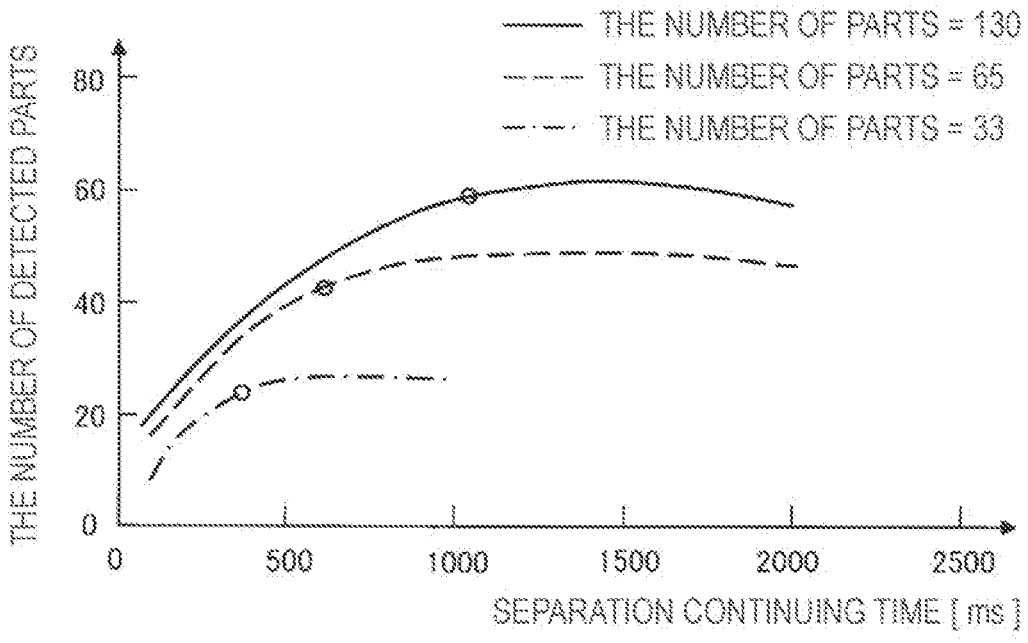
FIG. 22E is an explanatory diagram of a continuing time of the separation operation.

FIG. 22E illustrates an example of a relationship between the continuing time of the separation operation in step S450 and the number of parts detected as pickable. In this example, results obtained in three cases where the number of parts in the part feeder 400 is 130, 65, and 33 are illustrated for reference. As can be understood from the examples, the detected number of parts PP that can be picked up increases as the continuing time of the separation operation increases, but saturates after reaching certain continuing times. Therefore, continuing times (times indicated by open circles in FIG. 22E) in which the number of parts that can be picked up is sufficiently large and the continuing time of the separation operation is not excessively long are determined as the continuing time of the separation operation. It is possible to automatically determine the continuing time of the separation operation, for example, as a time to reach a value obtained by multiplying a peak value of the number of parts that can be picked up by a predetermined coefficient K. It is preferable to set the coefficient K to a value of, for example, less than one and 0.9 or more.

In step S460, control parameters of the centering command to avoid the interference region Rint are adjusted. The interference region Rint is a region where the gripping mechanism 164 interferes with the outer peripheral wall 414 in the outer periphery portion of the part accommodating region 412 as described with reference to FIG. 12A in the third embodiment. In the adjustment process, for example, the plurality of parts PP are accommodated in the part accommodating region 412, the separation operation (FIG. 4B) is performed, and then the centering operation (step S225 of FIG. 11 and FIG. 12B) for the interference region Rint is executed, and an image acquired by the camera 430 is analyzed to obtain the number of the parts PP that can be picked up. It is preferable to determine whether the picking up is possible by ignoring the front and back of the part PP. It is preferable that the number of parts PP accommodated in the part accommodating region 412 is, for example, the appropriate number of parts determined in step S440. This process is executed respectively under conditions that the continuing time of the centering operation is subsequently changed, and a continuing time during which the number of parts that can be picked up is sufficiently large and the continuing time of the centering operation is not excessively long is determined as the continuing time of the centering operation for avoiding the interference region.

In step S470, control parameters of the flip command are adjusted. In the adjustment process, for example, one part PP is accommodated in the part accommodating region 412, the flip operation (FIG. 4C) by the flip command is performed, and then an image acquired by the camera 430 is analyzed to determine whether the part PP is inverted. This process is executed respectively under conditions that the continuing time of the flip operation is subsequently changed, and a continuing time during which a probability of inverting the part PP is high and the continuing time of the flip operation is not excessively long is determined as the continuing time of the flip operation.

In step S480, control parameters of the feed command are adjusted. In the adjustment process, for example, the plurality of parts PP are accommodated in the part accommodating region 412, the feed operation (FIG. 4A) by the feed command is performed, and then an image acquired by the camera 430 is analyzed to determine the movement amounts of the parts PP. This process is executed respectively under conditions that the continuing time of the feed operation is subsequently changed, and a time during which the movement amounts of the parts PP are appropriate is determined as the continuing time of the feed operation. Alternatively, the continuing time of the feed operation may be determined by obtaining a movement speed [mm/sec] of the parts PP. It is possible to obtain the movement speed [mm/sec] of the parts PP, for example, by accommodating the plurality of parts PP in the part accommodating region 412, performing the feed operation (FIG. 4A) by the feed command for a constant time (for example, one second), and then analyzing an image acquired by the camera 430. Then, it is possible to determine the continuing time of the feed operation by multiplying a distance to be moved by the movement speed.

In step S490, a part replenishment condition by the hopper 500 is determined. In this process, for example, the hopper 500 is operated for a constant time to replenish the part PP to the part accommodating region 412 and an image acquired by the camera 430 is analyzed to obtain the number of replenished parts. This process is executed respectively under conditions that a replenishment time of the hopper 500 is subsequently changed, and a time during which the number of replenished parts PP is appropriate is determined as the replenishment time of the hopper 500. As the number of replenished parts PP, it is preferable to determine both the number of initial replenishments in step S200 of FIG. 6 and the number of replenishments after the second replenishment in step S170. As described above, in the case where the part accommodating region 412 is divided into $N_{412}$ ($N_{412}$ is integer of two or more) partitions, the number of replenishments after the second replenishment may be set to the value of $1/(N_{412}-1)$ of the number of initial replenishments. Alternatively, the part replenishment condition may be determined by obtaining a supply speed [pcs/sec] of the parts PP. For example, the hopper 500 is operated for a constant time (for example, one second) to replenish the part PP to the part accommodating region 412 and an image acquired by the camera 430 is analyzed to obtain the number of replenished parts and the supply speed [pcs/sec] of the parts PP by the hopper 500. Then, it is possible to obtain the replenishment time of the hopper 500 by dividing the number of parts to be supplied by the supply speed.

Various control parameters set as described above are stored in the non-volatile memory 230 (FIG. 2) of the control apparatus 200. The control command in which the part feeder control unit 212 transmits to the part feeder 400 is configured so as to include the control parameters relating to the plurality of vibration actuators 424 among the control parameters set in this manner. In other words, the part feeder control unit 212 selects one or more control commands from the plurality of control commands respectively including the control parameters of the plurality of vibration actuators 424 and transmits the selected control command to the part feeder 400 for causing the part feeder 400 to perform the operation according to the selected control command. Accordingly, it is possible to transmit the control parameters suitable for the operation of the part feeder 400 to the part feeder 400. As a result, it is possible to appropriately operate the part feeder 400 according to the type and the shape of the part PP. Alternatively, it is possible to improve the efficiency of the work of picking up the part PP from the part feeder 400.

The invention is not limited to the embodiments, the examples, and the modification examples described above, and can be realized in various configurations without departing from the spirit of the invention. For example, the technical features in the embodiments, the examples, and the modification examples corresponding to the technical features in each aspect described in the summary section can be replaced or combined as appropriate in order to solve part or all of the problems described above, or to achieve part or all of the effects described above. When the technical feature is not described as an essential feature in this specification, the feature can be deleted as appropriate.

The entire disclosures of Japanese Patent Application Nos. 2017-111275, filed Jun. 6, 2017 and 2017-214446, filed Nov. 7, 2017 are expressly incorporated by reference herein.

What is claimed is:

1. A control apparatus that controls a robot system including a part feeder having a container that accommodates a plurality of parts and a plurality of vibration actuators for vibrating the container, and a robot having an end effector for picking up one of the parts from the container, the control apparatus comprising:

a memory configured to store computer-executable instructions, a plurality of control commands including first control command and second control command, and image data of the parts including first image data, second image data, and third image data; and a processor that is configured to execute the computer-executable instructions so as to:

cause a camera to capture an image of the parts in the container so as to create captured image corresponding to captured image data;

compare the captured image data with the image data stored in the memory;

perform a first activation in which at least one of the vibration actuators transmits vibration to the container so as to move the parts from a distal end to a proximal end of the container along a first direction when the captured image data correspond to the first image data, the distal end of the container being directly adjacent to a supply source of the parts, the proximal end of the container being directly adjacent to a part tray;

perform a second activation in which the vibration actuators transmit vibration to the container so as to flip the parts in the container when the captured image data correspond to the second image data; and cause the end effector to pick up one of the parts located near the proximal end of the container and move the picked part to the part tray when the captured image data correspond to the third image data, wherein the processor selects the first control command in the first activation, and the processor selects the second control command in the second activation, and a vibration time of the vibration corresponding to the first control command is longer than a vibration time of the vibration corresponding to the second control command.

2. [The control apparatus according to claim 1, wherein the plurality of control commands include third control command, and the processor is configured to perform a third activation in which the vibration actuators transmit vibration to the container so as to separate the parts gathered in the container when the processor selects the third control command.] *A control apparatus that controls a robot system including a part feeder having a container that accommodates a part and a plurality of vibration actuators for vibrating the container, and a robot having an end effector for picking up a part from the container, the apparatus comprising: a processor that is configured to execute computer-executable instructions so as to control the part feeder and the robot, wherein the processor is configured to select one or more control commands from a plurality of control commands respectively including control parameters of the plurality of vibration actuators and transmits the selected control command to the part feeder for causing the part feeder to perform an operation according to the selected control command, the number of the vibration actuators is four, and the vibration actuators are mounted at four corners of a part accommodating region, the plurality of control commands include a separation command for causing the part feeder to execute a separation operation to separate a plurality of parts gathered in the container, and the plurality of control commands include a posture change command for causing the part feeder to execute a posture change operation to change a posture of a part in the container.*

3. The control apparatus according to claim 2, wherein the container includes [a] *the* part accommodating region and an outer peripheral wall provided at an outer periphery of the part accommodating region, and an interference region where a gripping mechanism of the end effector interferes with the outer peripheral wall exists in the outer periphery of the part accommodating region, wherein the plurality of control commands include [fifth control] *a part moving* command, the processor is configured to perform [a fifth] *an* activation in which the vibration actuators transmit vibration to the container so as to move the parts existing in the interference region toward an inside of the part accommodating region when the processor selects the [fifth control] *part moving* command[, and the processor performs the fifth activation after the processor performs the third activation].

[4. The control apparatus according to claim 2, wherein the plurality of control commands include fourth control command, and the processor is configured to perform a fourth activation in which the vibration actuators transmit vibration to the container so as to change a posture of one of the parts in the container when the processor selects the fourth control command.]

5. The control apparatus according to [claim 4.] *claim 2,* wherein a vibration time of the vibration corresponding to the [third control] *separation* command is longer than a vibration time of the vibration corresponding to the [fourth control] *posture change* command.

6. The control apparatus according to [claim 1.] *claim 2,* wherein the processor is configured to:

perform image recognition for recognizing at least one of the parts in the container based on [the] *a* captured image; and select one or more control commands from the plurality of control commands using a result of the image recognition and transmit the selected control command to the part feeder.

7. The control apparatus according to claim 6, wherein the processor is configured to virtually divide an accommodating region of the container into a plurality of partitions including a replenishment partition that receives the parts from [the] *a* supply source and a picking partition in which the end effector picks up one of the parts, wherein, when one of the parts existing in the picking partition is recognized by the image recognition, the processor controls the robot so as to pick up the recognized part by the end effector, and wherein, when no existence of one of the parts in the picking partition is recognized by the image recognition, the processor selects [the] *a* first control command to the part feeder to move the parts from a partition other than the picking partition to the picking partition.

8. The control apparatus according to claim 7, wherein, when one of the parts that is not capable of picking up by the end effector in the picking partition is recognized by the image recognition, the processor selects [the] *a* second control command to flip the one of the parts in the container.

9. The control apparatus according to claim 7, wherein the plurality of partitions further includes an intermediate partition provided between the replenishment partition and the picking partition along [the] *a* first direction, and wherein, when the processor selects the first control command, the parts existing in the replenishment partition move to the intermediate partition and the parts existing in the intermediate partition move to the picking partition.

10. The control apparatus according to claim 7, wherein the end effector has a first pick-up mechanism and a second pick-up mechanism, and wherein the processor is configured to perform:

a process of recognizing one of the parts existing in the picking partition as a first pickable part picked by the first pick-up mechanism;

a process of picking up the first pickable part with the first pick-up mechanism; and a process of recognizing another of the parts existing in the picking partition as a second pickable part picked by the second pick-up mechanism when the first pickable part is held by the first pick-up mechanism.

11. The control apparatus according to claim 10, wherein the processor is configured to perform a process of recognizing some parts of the parts existing in the picking partition as the second pickable parts picked by the second pick-up mechanism, and the processor is configured to select one of the second pickable parts picked by the second pick-up mechanism based on a locational relationship between the second pick-up mechanism and the second pickable parts when the first pickable part is held by the first pick-up mechanism.

12. The control apparatus according to [claim 1,] *claim 6,* wherein the processor is configured to perform:

a setting process of setting additional regions at a plurality of places of an outer edge of each of the parts in the captured image, the additional regions are gripped by a gripping mechanism of the end effector; and a recognition process of recognizing one of the parts in which the additional regions do not overlap with another part as a grippable part in the captured image, and wherein the processor is configured to control the robot so as to grip and pick up the grippable part with the gripping mechanism of the end effector.

13. The control apparatus according to claim 12, wherein the processor is configured to perform:

an image update process of updating the captured image by deleting the grippable part from the captured image after the recognition process so as to create an updated image; and a repetition process of repeating the recognition process and the image update process using the updated image, wherein the processor is configured to create an order in which the part is recognized as the grippable part when the recognition process and the image update process are repeated and to store the order in the memory, and wherein the processor is configured to control the robot so as to grip and pick up the part with the gripping mechanism of the end effector according to the order.

14. The control apparatus according to [claim 1,] *claim 2,* wherein, when the vibration actuators transmit vibration to the container, the vibration is created based on control parameters including a frequency of a vibration signal to be supplied to each of the vibration actuators, amplitude of the vibration signal, and a vibration time.

15. The control apparatus according to claim 14, wherein the memory stores the control parameters of the plurality of vibration actuators, and wherein the control parameters stored in the memory include (a) balance of vibration intensity between the plurality of vibration actuators, (b) a frequency of the vibration signal that is capable of activating a motion of at least one of the parts existing in the container, and (c) amplitude of the vibration signal that is capable of preventing one of the parts existing in the container from jumping out of the container.

16. [A robot system comprising:

a part feeder having a container that accommodates a plurality of parts and a plurality of vibration actuators for vibrating the container;

a robot having an end effector for picking up one of the parts from the container;

a camera configured to capture an image of the parts;

a memory configured to store computer-executable instructions, a plurality of control commands including first control command and second control command, and image data of the parts including first image data, second image data, and third image data; and a processor that is configured to execute the computer-executable instructions so as to:

cause the camera to capture the image of the parts in the container so as to create captured image corresponding to captured image data;

compare the captured image data with the image data stored in the memory;

perform a first activation in which at least one of the vibration actuators transmits vibration to the container so as to move the parts from a distal end to a proximal end of the container along a first direction when the captured image data correspond to the first image data, the distal end of the container being directly adjacent to a supply source of the parts, the proximal end of the container being directly adjacent to a part tray;

perform a second activation in which the vibration actuators transmit vibration to the container so as to flip the parts in the container when the captured image data correspond to the second image data; and cause the end effector to pick up one of the parts located near the proximal end of the container and move the picked part to the part tray when the captured image data correspond to the third image data, wherein the processor selects the first control command in the first activation, and the processor selects the second control command in the second activation, and a vibration time of the vibration corresponding to the first control command is longer than a vibration time of the vibration corresponding to the second control command.] *A robot system comprising: a part feeder having a container that accommodates a part and a plurality of vibration actuators for vibrating the container; a robot having an end effector for picking up a part from the container; and the control apparatus having a processor that is configured to execute computer-executable instructions so as to control the part feeder and the robot, wherein the processor is configured to select one or more control commands from a plurality of control commands respectively including control parameters of the plurality of vibration actuators and transmits the selected control command to the part feeder for causing the part feeder to perform an operation according to the selected control command, the number of the vibration actuators is four, and the vibration actuators are mounted at four corners of a part accommodating region, the plurality of control commands include a separation command for causing the part feeder to execute a separation operation to separate a plurality of parts gathered in the container, the plurality of control commands include a posture change command for causing the part feeder to execute a posture change operation to change a posture of a part in the container.*

[17. The robot system according to claim 16, wherein the plurality of control commands include third control command, and the processor is configured to perform a third activation in which the vibration actuators transmit vibration to the container so as to separate the parts gathered in the container when the processor selects the third control command.]

[18. The robot system according to claim 17, wherein the Plurality of control commands include fourth control command, and the processor is configured to perform a fourth activation in which the vibration actuators transmit vibration to the container so as to change a posture of one of the parts in the container when the processor selects the fourth control command.]

19. The robot system according to [claim 18] *claim 16*, wherein a vibration time of the vibration corresponding to the [third control] *separation* command is longer than a vibration time of the vibration corresponding to the [fourth control] *posture change* command.

20. The robot system according to claim 16, wherein the processor is configured to:

perform image recognition for recognizing at least one of the parts in the container based on [the] *a* captured image; and select one or more control commands from the plurality of control commands using a result of the image recognition and transmit the selected control command to the part feeder.

* * * * *